United States Patent
King et al.

(10) Patent No.: US 8,596,691 B2
(45) Date of Patent: *Dec. 3, 2013

(54) FITTINGS CONNECTABLE TO END PORTIONS OF PIPES AND RELATED METHODS

(75) Inventors: Thomas A. King, Chesterfield, MO (US); Duane K. Smith, St. Charles, MO (US); Douglas L. Kirk, Ballwin, MO (US)

(73) Assignee: Blazing Products, Inc., Chesterfield, MO (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/416,281

(22) Filed: Mar. 9, 2012

(65) Prior Publication Data

US 2012/0169041 A1  Jul. 5, 2012

Related U.S. Application Data

(63) Continuation of application No. 11/868,231, filed on Oct. 5, 2007, now Pat. No. 8,172,276.

(60) Provisional application No. 60/914,669, filed on Apr. 27, 2007, provisional application No. 60/850,219, filed on Oct. 6, 2006.

(51) Int. Cl.
*F16L 39/00* (2006.01)

(52) U.S. Cl.
USPC .............. 285/320; 285/87; 285/308; 285/331; 285/394; 285/420; 403/330

(58) Field of Classification Search
None
See application file for complete search history.

(56) References Cited

U.S. PATENT DOCUMENTS

| | | | |
|---|---|---|---|
| 15,846 A | 10/1856 | Ferry |
| 105,818 A | 7/1870 | Lord |
| 224,586 A | 2/1880 | Earle |
| 278,961 A | 6/1883 | Hobbs |
| 484,656 A | 10/1892 | Doolittle |
| 535,880 A | 3/1895 | Anderson |
| 545,066 A | 8/1895 | Fregeau |
| 567,962 A | 9/1896 | Cooper |
| 589,216 A | 8/1897 | McKee |
| 651,134 A | 6/1900 | Dickens |

(Continued)

OTHER PUBLICATIONS

Olson Irrigation Systems EZ-E11, http://www.olsonirrigation.com/PROD/OISEZEL/OLSezel.html, web page printed Feb. 27, 2007.

(Continued)

*Primary Examiner* — Aaron Dunwoody
*Assistant Examiner* — Fannie Kee
(74) *Attorney, Agent, or Firm* — Schroeder & Siegfried, P.A.

(57) ABSTRACT

A fitting connectable to an end portion of a pipe generally includes a housing configured for receiving at least part of the end portion of the pipe into the housing, and an insert member disposed at least partly within the housing. The insert member is configured to be received at least partly within the end portion of the pipe when at least part of the end portion of the pipe is received into the housing. A retention member is movable relative to the housing for selectively connecting the fitting to the end portion of the pipe. The retention member is movable to press at least part of the end portion of the pipe radially against at least part of the insert member to help secure the fitting to the end portion of the pipe when the end portion of the pipe is received into the housing.

36 Claims, 42 Drawing Sheets

(56) References Cited

U.S. PATENT DOCUMENTS

| | | |
|---|---|---|
| 679,399 A | 7/1901 | Smith et al. |
| 781,952 A | 2/1905 | Jones |
| 1,370,739 A | 3/1921 | Gay |
| 1,606,320 A | 11/1926 | Scott |
| 1,802,499 A | 4/1931 | Chapman |
| 1,928,316 A | 9/1933 | Muto |
| 2,332,350 A | 10/1943 | Scritchfield |
| 2,344,163 A | 3/1944 | Misch |
| 2,478,586 A | 8/1949 | Krapp |
| 2,793,055 A | 5/1957 | Meyerhoefer |
| 2,833,567 A | 5/1958 | Bacher et al. |
| 2,839,075 A | 6/1958 | Mueller |
| 2,978,262 A | 4/1961 | Franck |
| 3,154,329 A | 10/1964 | Skinner |
| 3,158,388 A | 11/1964 | Marshall |
| 3,162,211 A | 12/1964 | Barusch |
| 3,167,335 A | 1/1965 | Maisch |
| 3,258,822 A | 7/1966 | Schlesch et al. |
| 3,280,846 A | 10/1966 | Anderson et al. |
| 3,343,724 A | 9/1967 | Malpas |
| 3,432,188 A | 3/1969 | Turner |
| 3,439,942 A | 4/1969 | Moore et al. |
| 3,460,715 A | 8/1969 | Lane et al. |
| 3,460,721 A | 8/1969 | Hamel et al. |
| 3,471,176 A | 10/1969 | Gilchrist |
| 3,489,441 A | 1/1970 | Malcolm |
| 3,495,615 A | 2/1970 | Ehrens et al. |
| 3,509,905 A | 5/1970 | Mullins |
| 3,554,217 A | 1/1971 | Ehrens |
| 3,580,269 A | 5/1971 | Ehrens |
| 3,633,948 A | 1/1972 | Dickey |
| 3,756,267 A | 9/1973 | Hutton |
| 3,762,263 A | 10/1973 | Bocceda |
| 3,825,286 A | 7/1974 | Henry, III |
| 3,891,150 A | 6/1975 | Hoff et al. |
| 3,990,729 A | 11/1976 | Szentmihaly et al. |
| 3,999,785 A | 12/1976 | Blakeley |
| 4,034,802 A | 7/1977 | Schwarz |
| 4,076,038 A | 2/1978 | Wynne |
| 4,112,944 A | 9/1978 | Williams |
| 4,158,461 A | 6/1979 | Francis |
| 4,183,120 A | 1/1980 | Thorne |
| 4,212,487 A | 7/1980 | Jones et al. |
| 4,222,593 A | 9/1980 | Lauffenburger |
| 4,225,162 A | 9/1980 | Dola |
| 4,239,265 A | 12/1980 | King, Sr. |
| 4,258,742 A | 3/1981 | Louthan et al. |
| 4,364,406 A | 12/1982 | Bohlin |
| 4,373,235 A | 2/1983 | Korgaonkar |
| 4,396,210 A | 8/1983 | Spencer et al. |
| 4,434,809 A | 3/1984 | Rogstadius |
| 4,522,339 A | 6/1985 | Costa |
| 4,540,011 A | 9/1985 | Croxford et al. |
| 4,557,024 A | 12/1985 | Roberts et al. |
| 4,574,443 A | 3/1986 | Persak et al. |
| 4,647,075 A | 3/1987 | Vargo |
| 4,730,636 A | 3/1988 | Volgstadt et al. |
| 4,763,932 A | 8/1988 | Matz et al. |
| 4,789,189 A | 12/1988 | Robertson |
| D307,541 S | 5/1990 | Tres |
| 4,935,992 A | 6/1990 | Due |
| 5,054,820 A | 10/1991 | Lesquir et al. |
| 5,076,318 A | 12/1991 | Fedora |
| 5,095,564 A | 3/1992 | Kruger |
| 5,105,844 A | 4/1992 | King, Sr. |
| 5,157,815 A | 10/1992 | Dyer |
| 5,216,784 A | 6/1993 | Dyer |
| 5,241,981 A | 9/1993 | Ahern |
| 5,345,964 A | 9/1994 | Friedel |
| 5,425,395 A | 6/1995 | Brennan |
| 5,518,278 A | 5/1996 | Sampson |
| 5,577,529 A | 11/1996 | Katz |
| 5,609,181 A | 3/1997 | Evans |
| 5,640,991 A | 6/1997 | King |
| 5,671,770 A | 9/1997 | Rusche et al. |
| 5,694,972 A | 12/1997 | King |
| 5,732,732 A | 3/1998 | Gross et al. |
| 5,846,412 A | 12/1998 | Tharp |
| 5,896,885 A | 4/1999 | Svetlik |
| 5,921,586 A | 7/1999 | Prassas et al. |
| 5,964,240 A | 10/1999 | Granovski |
| 5,964,241 A | 10/1999 | King |
| 5,967,168 A | 10/1999 | Kitani et al. |
| 6,012,475 A | 1/2000 | Taylor et al. |
| 6,015,168 A | 1/2000 | Fahl |
| 6,062,607 A | 5/2000 | Bartholomew |
| 6,089,619 A | 7/2000 | Goda |
| 6,216,723 B1 | 4/2001 | King |
| 6,220,635 B1 | 4/2001 | Vitel et al. |
| 6,357,472 B1 | 3/2002 | King |
| 6,439,620 B1 | 8/2002 | Guest |
| 6,473,943 B1 | 11/2002 | Thacker |
| 6,510,865 B2 | 1/2003 | King |
| 6,601,605 B2 | 8/2003 | King, Jr. |
| 6,767,033 B2 | 7/2004 | King et al. |
| 6,773,036 B1 | 8/2004 | King |
| 6,791,031 B1 | 9/2004 | Manning |
| 6,986,532 B1 | 1/2006 | King |
| 2001/0032667 A1 | 10/2001 | King, Jr. et al. |
| 2002/0163191 A1 | 11/2002 | Muenster et al. |

OTHER PUBLICATIONS

Why Blu-Lock, The Future of Irrigation Installation, http://www.blulock.com/why.html, web page printed Apr. 12, 2007.

FITTINGS CONNECTABLE TO END PORTIONS OF PIPES AND RELATED METHODS

CROSS-REFERENCE TO RELATED APPLICATIONS

This application is a continuation of U.S. patent application Ser. No. 11/868,231, filed Oct. 5, 2007, which claims the benefit of U.S. Provisional Patent Application No. 60/914,669, filed Apr. 27, 2007 and U.S. Provisional Patent Application No. 60/850,219, filed Oct. 6, 2006. The entire disclosures of these applications are incorporated herein by reference.

FIELD

The present disclosure relates generally to fittings for pipes and, more particularly, to fittings connectable to end portions of pipes for, for example, closing the pipes, connecting the pipes to one or more additional pipes, connecting the pipes to irrigation sprinklers, etc.

BACKGROUND

The statements in this section merely provide background information related to the present disclosure and may not constitute prior art.

A pipe fitting may be connected to an end portion of a pipe for, for example, closing the pipe, connecting the pipe to one or more other pipes, etc. In addition in irrigation systems, fittings may be used for connecting an end of a pipe to one or more irrigation sprinklers.

Some pipe fittings may include a barb receivable within an end portion of a pipe. In these fittings, a clamp is often fastened over the pipe, adjacent where the barb is received within the end portion of the pipe, for compressing the pipe against the barb to form a sealed connection between the fitting and the pipe. However, fastening the clamp around the pipe can be burdensome and time consuming and typically requires one or more tools. As an alternative, a sealant or adhesive compound may be used to bond and/or seal the barb within the end portion of the pipe. However, the sealant or adhesive compound often requires time to set before the connection is secure and further work can be performed.

SUMMARY

According to various aspects, exemplary embodiments are provided of fittings connectable to end portions of pipes. In one exemplary embodiment, a fitting generally includes a housing configured for receiving at least part of the end portion of the pipe into the housing. An insert member is disposed at least partly within the housing. The insert member is configured to be received at least partly within the end portion of the pipe when at least part of the end portion of the pipe is received into the housing. A retention member is pivotally coupled to the housing for pivotal movement relative to the housing to selectively connect the fitting to the end portion of the pipe. The retention member is pivotally moveable to engage the end portion of the pipe and apply pressure against at least part of the end portion of the pipe when at least part of the end portion of the pipe is received into the housing.

In another exemplary embodiment, a fitting connectable to an end portion of a pipe generally includes a housing configured for receiving at least part of the end portion of the pipe into the housing. An insert member is disposed at least partly within the housing. The insert member is configured to be received at least partly within the end portion of the pipe when at least part of the end portion of the pipe is received into the housing. A retention member is movable relative to the housing for selectively connecting the fitting to the end portion of the pipe. The retention member is movable to press at least part of the end portion of the pipe against at least part of the insert member to help secure the fitting to the end portion of the pipe when the end portion of the pipe is received into the housing.

In still another exemplary embodiment, a fitting connectable to an end portion of a pipe generally includes a body and a retention member pivotally coupled to the body for pivotal movement relative to the body between a first position in which the fitting disconnected from the end portion of the pipe and a second position in which the fitting is connected to the end portion of the pipe. The retention member is pivotally moveable from the first position to the second position to engage the end portion of the pipe and apply pressure against at least part of the end portion of the pipe to help frictionally secure the fitting to the end portion of the pipe.

In a further exemplary embodiment, a fitting connectable to an end portion of a pipe generally includes a housing configured for receiving at least part of the end portion of the pipe into the housing, and an insert member coupled to the housing for inserting into an open end of a passageway of the end portion of the pipe. A retention member is movable relative to the housing to at least partially secure the insert member within the passageway of the end portion of the pipe. At least one sealing member is positioned about a surface of the insert member and configured for engaging a surface of the pipe upon insertion of the insert member into the passageway, and configured for compressing between the surface of the insert member and the surface of the pipe.

In another exemplary embodiment, a fitting connectable to an end portion of a pipe generally includes a housing configured for receiving at least part of the end portion of the pipe into the housing. The housing includes a first end for receiving at least part of the end portion of the pipe into the housing and a second end opposite the first end. The housing also includes one or more openings adjacent its second end positioned so that at least part of the end portion of the pipe is visible through the one or more openings when the end portion of the pipe is received into the housing. Whereby the one or more openings provide a visual indication of reception of the pipe into the housing.

In other exemplary embodiments, exemplary methods are provided for connecting a fitting to an end portion of a pipe. One exemplary method generally includes positioning the fitting relative to the end portion of the pipe such that an insert member of the fitting is inserted into an inner passageway of the end portion of the pipe, and the end portion of the pipe is received into a housing of the fitting. And pivoting a retention member relative to the housing into engagement with the end portion of the pipe to apply pressure to at least part of the pipe to retain the fitting on the pipe.

In another exemplary embodiment, an exemplary method for connecting a fitting to an end portion of a pipe generally includes positioning an insert member into an inner passageway of the pipe, and positioning a retention member over at least part of the pipe so that said at least part of the pipe is positioned between the retention member and the insert member. And moving the fitting onto the pipe so that the pipe and retention member move substantially conjointly into a space defined between a housing of the fitting and the insert member. And pressing at least part of the pipe against the insert member for retaining the fitting on the pipe.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
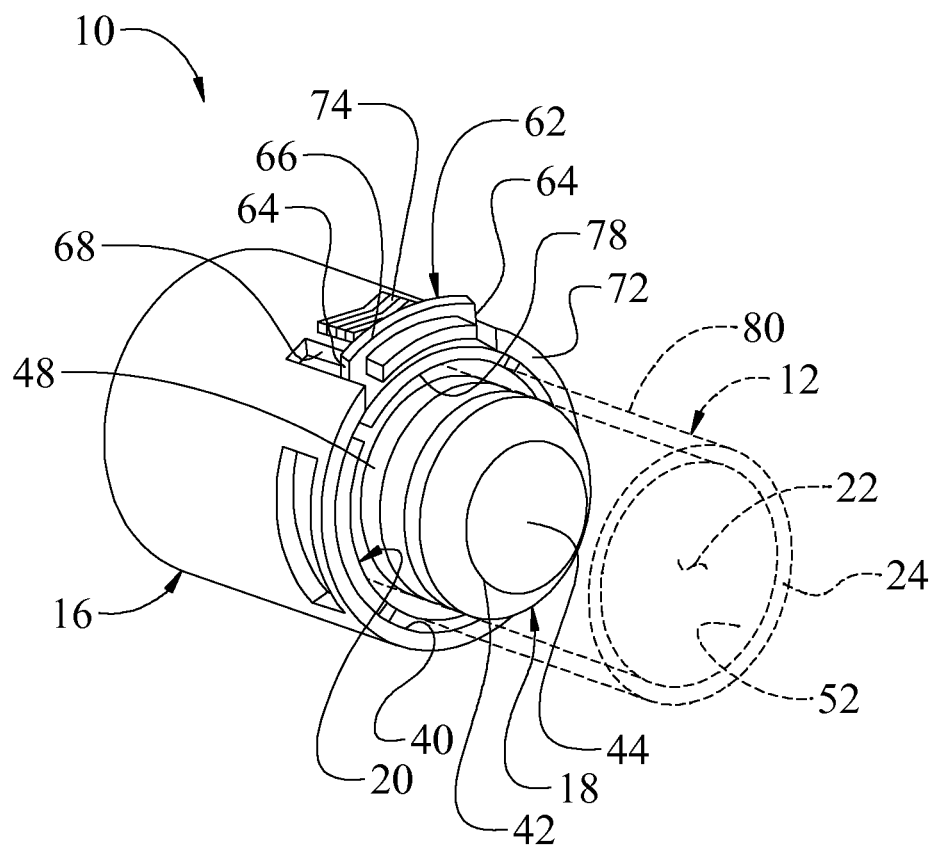
FIG. 1 is a perspective view of an exemplary embodiment of a fitting shown connected to an end portion of a pipe, where the pipe is shown in phantom to illustrate the connected relationship.

The following description is merely exemplary in nature and is not intended to limit the present disclosure, application, or uses. It should be understood that throughout the drawings, corresponding reference numerals indicate like or corresponding parts and features.

Figure 2:
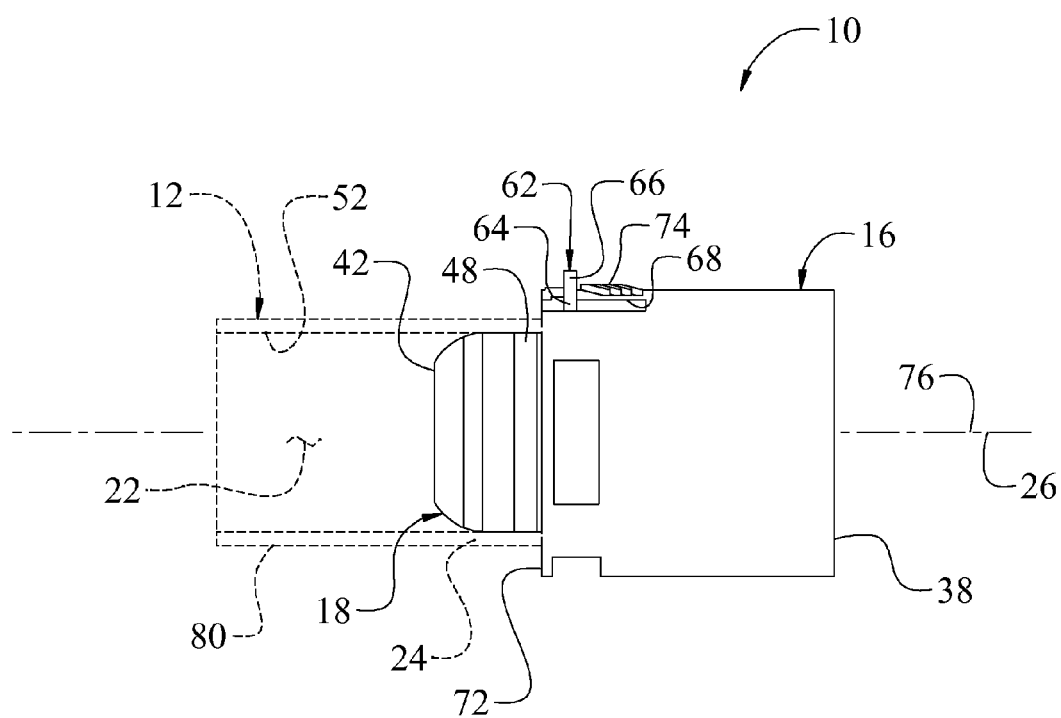
FIG. 2 is a side elevation view of the fitting of FIG. 1.
Figure 3:
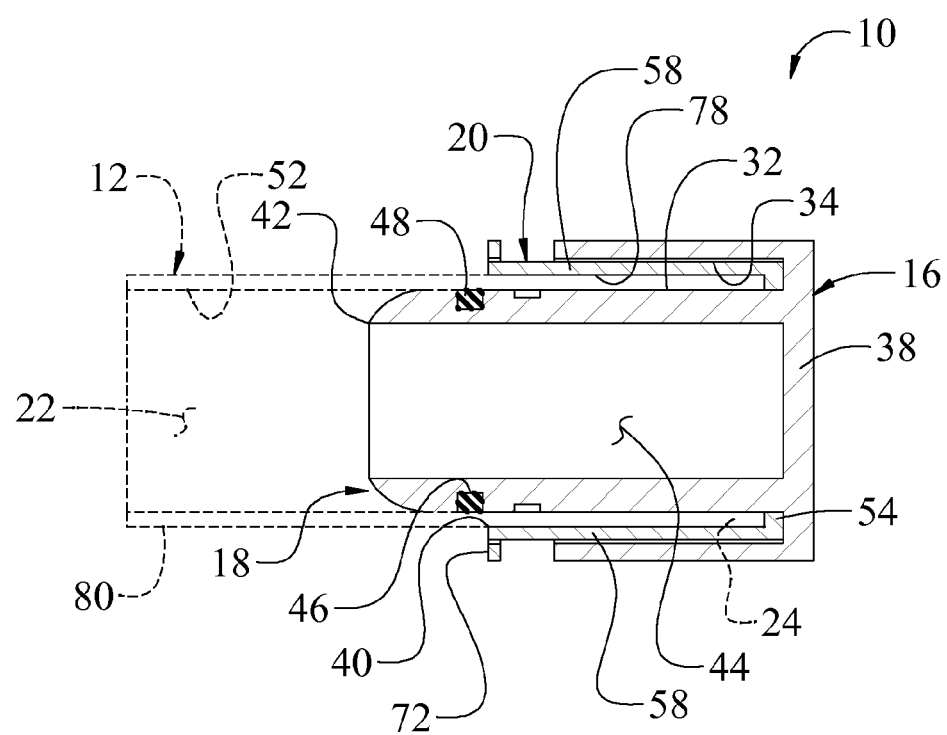
FIG. 3 is a longitudinal section of the fitting of FIG. 2.

With reference now to the drawings, and particularly to FIGS. 1-3, an exemplary embodiment of a fitting 10 is shown connected to an end portion of a pipe 12. The end portion of the pipe 12 is shown in phantom (with broken lines) to illustrate the connection between the fitting 10 and the pipe 12. The illustrated fitting 10 may be used for terminating, or closing, the pipe 12. In other exemplary embodiments, fittings may be used, for example, for connecting two or more pipes together; for connecting pipes to irrigation sprinklers; for connecting pipes to valves; for connecting pipes to other dissimilar tubing, pipes, etc.; etc. Pipes, as used herein, may include, for example, irrigation pipes, tubing, etc. within the scope of the disclosure.

The fitting 10 generally includes a housing 16 (e.g., a casing, etc.), an insert member 18, and a sleeve 20 (broadly, a retention member). Both the insert member 18 and the sleeve 20 are disposed, at least partly, within the housing 16. And, the sleeve 20 is disposed generally around the insert member 18 between the insert member 18 and the housing 16. The housing 16 and insert member 18 may broadly be referred to as a body of the fitting 10. But a fitting body should not be interpreted to require both a housing and an insert member. In other exemplary embodiments, for example, a fitting may include a body having only a housing or only an insert member.

The housing 16, the insert member 18, and the sleeve 20 are configured (e.g., sized, shaped, constructed, etc.) for cooperatively receiving the end portion of the pipe 12 into the housing 16. An inner passageway 22 of the pipe 12 passes over the insert member 18, and a wall 24 of the pipe 12 passes between the sleeve 20 and the insert member 18. Together, the housing 16, the insert member 18, and the sleeve 20 cooperate to retain the pipe 12 in the housing 16 (e.g., by frictionally squeezing the pipe, etc.).

Figure 4:
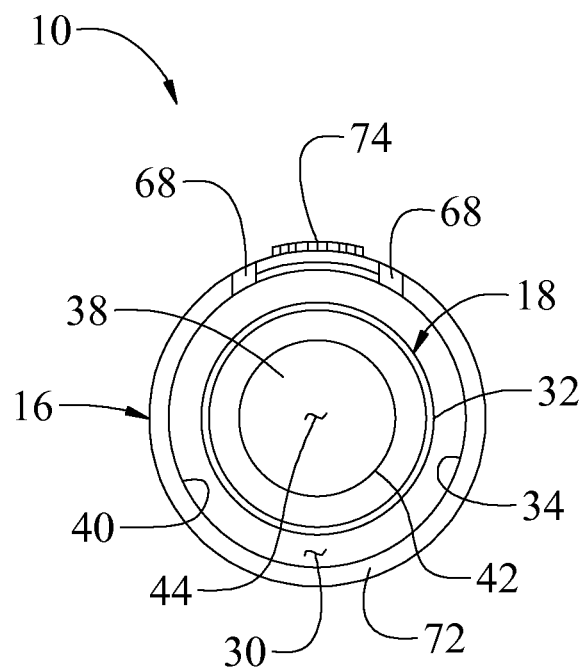
FIG. 4 is a forward end elevation view of a housing of the fitting of FIG. 1 with the pipe removed and a sleeve of the fitting removed.
Figure 5:
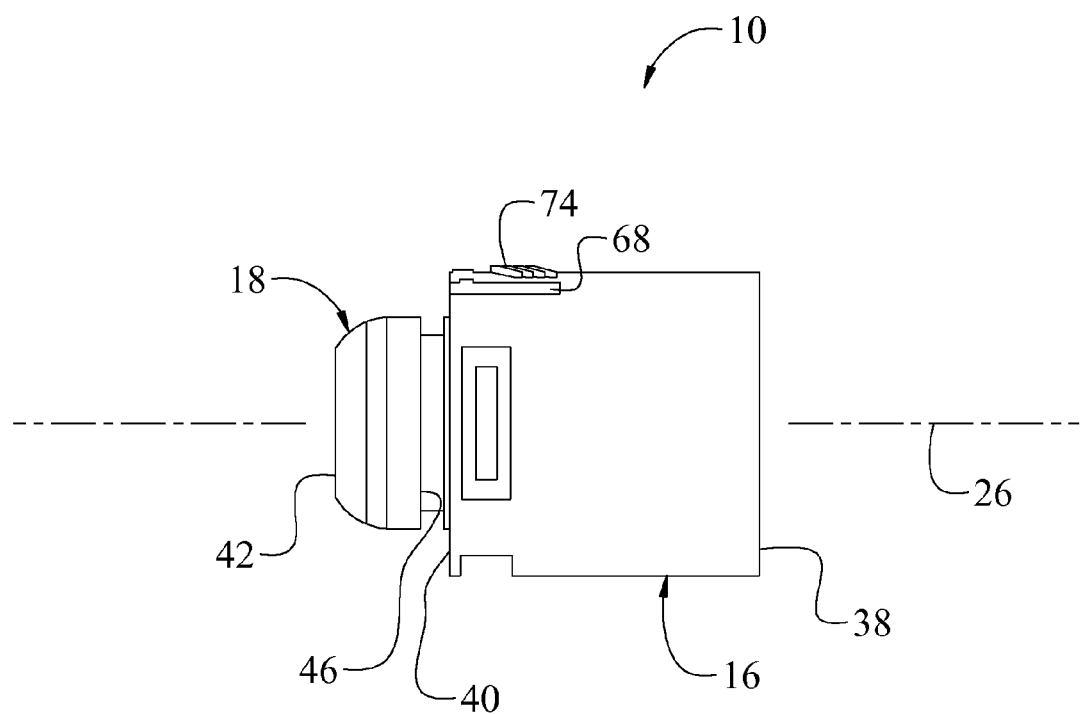
FIG. 5 is a side elevation view of the fitting of FIG. 4.
Figure 6:
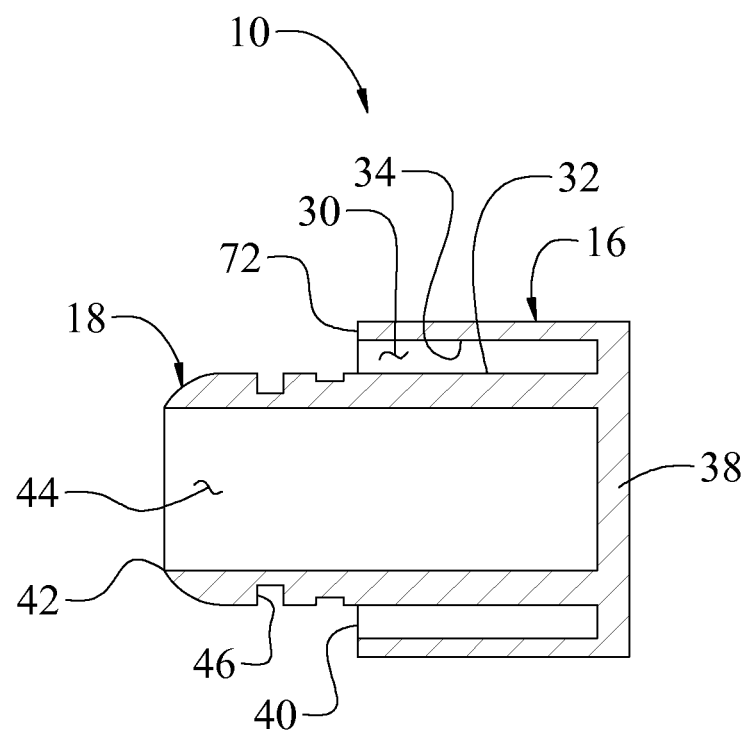
FIG. 6 is a longitudinal section view of the fitting of FIG. 5.

The housing 16 and insert member 18 of the fitting 10 are shown in FIGS. 4-6 with the sleeve 20 removed and the pipe 12 removed. The housing 16 and the insert member 18 are generally cylindrical in shape. The insert member 18 is disposed within the housing 16 generally concentrically with the housing 16 such that the housing 16 and the insert member 18 may have a common longitudinal axis 26 (FIG. 5), which is also a longitudinal axis of the fitting 10. In other exemplary embodiments, fittings may include insert members that are oriented non-concentrically within housings.

The insert member 18 is substantially uniformly spaced apart from the housing 16 within the housing. In other words, a space 30 (FIGS. 4 and 6) defined within the housing 16 between an outer surface 32 of the insert member 18 and an inner surface 34 of the housing 16 is generally uniform. The width of this space 30 will generally be larger than the thickness of the wall 24 of the pipe 12 to which the illustrated fitting 10 is to be connected (e.g., FIGS. 1-3, etc.). The wall 24 of the pipe 12 may thus be received into this space 30 when the fitting 10 is connected to the pipe. In other exemplary embodiments, fittings may include housings and insert members spaced apart by distances (e.g., widths, etc.) that are about equal to thicknesses of walls of pipes to which the fittings are to be connected. In still other exemplary embodiments, fittings may include housings and insert members spaced apart by distances (e.g., widths, etc.) that are not uniform around the housings. For example, the widths may increase along a length of the housings as extending from rearward ends toward forward ends of the housings. In addition, while in the illustrated fitting 10 the insert member 18 includes a generally constant diameter along its longitudinal length, other exemplary embodiments may include insert members with increasing or decreasing diameters along their longitudinal lengths.

The insert member 18 connects to the housing 16 at an end wall 38 at a rearward, closed end of the housing 16. The insert member 18 extends forward from the end wall 38 and passes through a forward opening 40 of the housing 16, where the forward opening 40 is located at a forward end of the housing generally opposite the end wall (e.g., FIG. 6, etc.). In the illustrated fitting 10, the insert member 18 is formed integrally, or monolithically, with the end wall 38 such that the insert member 18 is integral, or monolithic, with the housing 16. This may be accomplished by forming the housing 16 and insert member 18 as one piece of material using, for example, an acceptable molding process, other acceptable fabrication process, etc. In other exemplary embodiments, fittings may include insert members formed separately from housings and attached thereto. In still other exemplary embodiments, fittings may include insert members that are disposed substantially within housings such that the insert members do not extend out of the housings through open ends of the housings.

The insert member 18 includes an open end 42 extending generally out of the forward opening 40 of the housing 16, and an interior passage 44 extending from the open end 42 in a rearward direction to the end wall 38 of the housing 16. Here, the insert member 18 is closed at the end wall 38 so that fluid may not pass through the insert member 18 (or through the housing 16). At the opposing open end 42, the insert member 18 is configured (e.g., tapered, rounded, etc. in shape) for facilitating movement of the insert member into the pipe 12 when the fitting 10 is connected to the pipe (e.g., FIGS. 1-3, etc.). The open end 42 may be shaped differently than illustrated and/or described herein for facilitating movement of the insert member 18 into the pipe 12 within the scope of the disclosure. For example, an insert member may include a step-shaped open end, a squared-off open end, etc. within the scope of the disclosure. In other exemplary embodiments, fittings may include insert members that do not have interior passages, but instead are generally solid structures.

The insert member 18 also includes a channel 46 adjacent the open end 42 for receiving a sealing member, such as an O-ring 48 (e.g., FIGS. 1-3, etc.) over the insert member 18. The channel 46 extends around a periphery of the insert member 18 and is configured for receiving the O-ring 48 into a seated position within the channel 46. The O-ring 48 is configured to engage (e.g., compressively engage, etc.) an inner surface 52 of the pipe 12 when the fitting 10 is connected to the pipe. This helps seal the pipe 12 against the fitting 10 to help inhibit fluid from leaving, leaking from, etc. the pipe at the fitting. While in the illustrated fitting 10 the sealing member includes an O-ring 48, in other exemplary embodiments, fittings may include sealing members other than O-rings, including, for example, gaskets, etc. In still other exemplary embodiments, fittings may include sealing members integrally, or monolithically, molded or formed with insert members. In yet other exemplary embodiments, fittings may include housings having sealing members dimensioned and configured to engage outer surfaces of pipes to which the fittings are connected for helping seal the pipes at the fittings. In still further exemplary embodiments, fittings may include no sealing members, or alternatively may include two or more sealing members. In further exemplary embodiments, fittings may include sealing members dimensioned and configured to engage both inner surfaces of pipes and outer surfaces of pipes to which the fittings are connected for helping seal the pipes at the fittings.

Figure 7:
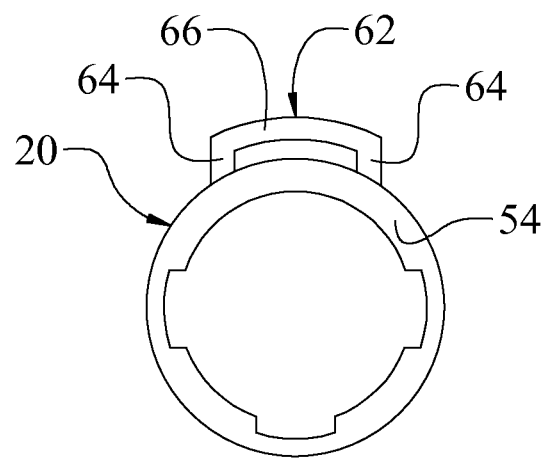
FIG. 7 is a rearward end elevation view of the sleeve of the fitting of FIG. 1.
Figure 8:
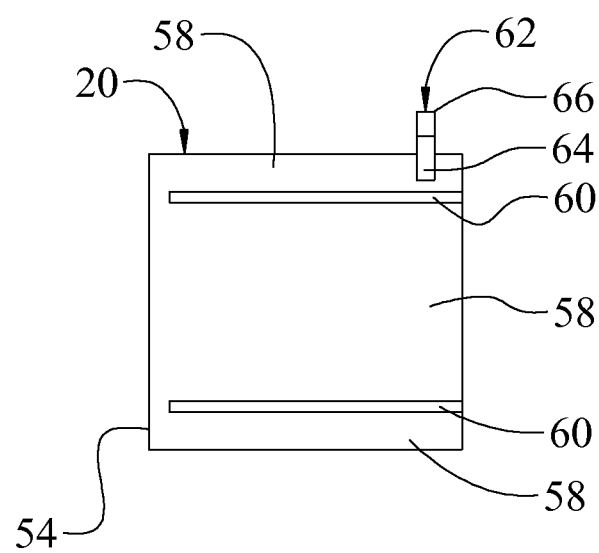
FIG. 8 is a side elevation view of the fitting of FIG. 7.

With reference now to FIGS. 7 and 8, the sleeve 20 includes a generally annular rearward lip 54 extending radially inwardly of the sleeve 20 and four resilient arms 58 extending generally forwardly from the lip 54. The arms 58 are positioned generally symmetrically about the sleeve 20 and are generally arcuate in shape for providing the sleeve 20 its generally tubular shape. A slot 60 separates each adjacent arm 58 such that each arm can move, at least slightly, relative to its adjacent arms 58. In the illustrated sleeve 20, the arms 58 are formed integrally, or monolithically, with the lip 54. This may be accomplished by forming the lip 54 and arms 58 as one piece of material using, for example, an acceptable molding process, other fabrication process, etc. In other exemplary embodiments, fittings may include sleeves with arms formed separate from lips and attached thereto. In still other exemplary embodiments, fittings may include sleeves with less than or more than four arms.

Figure 9:
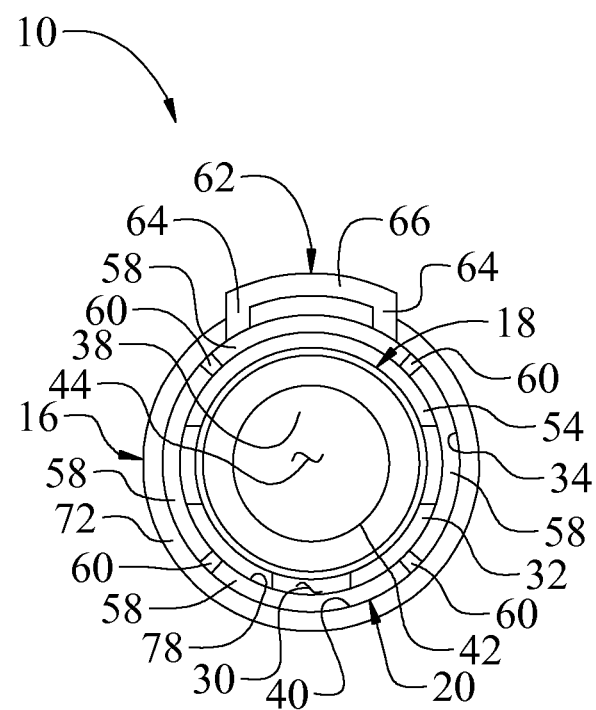
FIG. 9 is a forward end elevation view similar to FIG. 4 with the sleeve shown received in the housing of the fitting generally around an insert member of the fitting.
Figure 10:
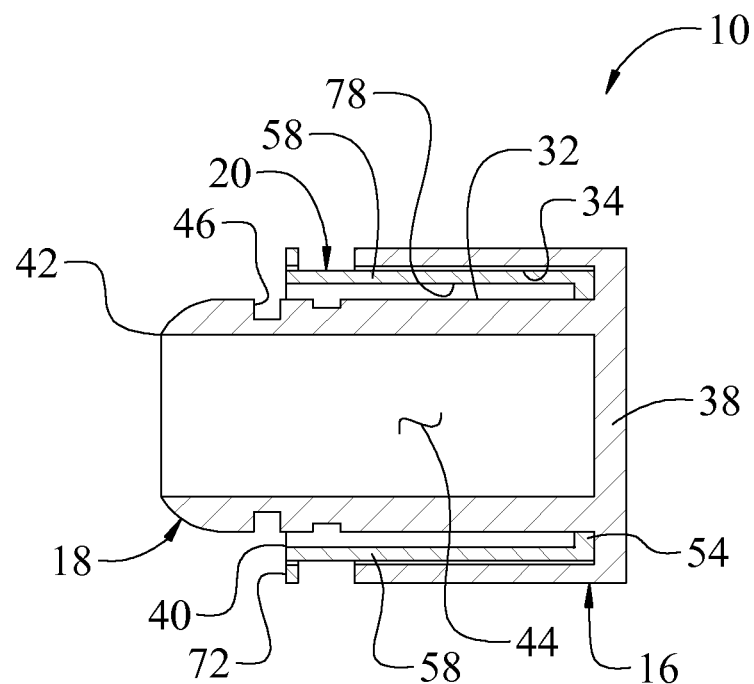
FIG. 10 is a longitudinal section view of the fitting of FIG. 9.

As shown in FIGS. 9 and 10, the lip 54 helps locate the sleeve 20 in the space 30 between the insert member 18 and the housing 16. In the illustrated fitting 10, the lip 54 is sized, widthwise, to closely fit within this space 30. This close fit of the lip 54 in the space 30 helps hold the sleeve 20 against radial movement within the housing 16, but still allows the sleeve 20 to move longitudinally of the housing 16 between, at the least, a first, extended position and second, retracted position as well as to rotate within the housing 16 when in the first (extended) position. In addition in the illustrated embodiment, the lip 54, along with the O-ring 48 (FIGS. 1-3), may help hold the sleeve 20 in the housing 16 when the sleeve moves toward its first (extended) position. For example, the lip 54 may engage the O-ring 48 when the sleeve 20 moves toward its first (extended) position and hold the sleeve in the housing 16.

The arms 58 of the sleeve 20 have a thickness dimension that is less than the width dimension of the lip 54 such that the arms 58 fit within the space 30 between the insert member 18 and housing 16, generally with room to spare. As will be further described, this excess room is available for receiving the wall 24 of the pipe 12 into the housing 16 for connecting the fitting 10 to the end portion of the pipe 12. Accordingly in the illustrated fitting 10, the combined thickness of an arm 58 of the sleeve 20 and the wall 24 of the pipe 12 is about equal to, or maybe slightly greater than, the width dimension of the space 30 between the insert member 18 and the housing 16. As will be seen, this close fit helps secure the fitting 10 to the pipe 12.

An exemplary process for connecting the fitting 10 to the end portion of the pipe 12 will now be described with reference to FIGS. 1-3, 11, and 12. As previously stated, the sleeve 20 of the fitting 10 is disposed, or received, in the housing 16 generally in the space 30 defined between the outer surface 32 of the insert member 18 and the inner surface 34 of the housing 16. The sleeve 20 is moveable at least longitudinally relative to both the housing 16 and the insert member 18 between, for example, the first position extending at least partly out of the housing 16 for help in installing the fitting 10 over the end portion of the pipe 12 (e.g., FIGS. 11 and 12, etc.), and the second position substantially retracted within the housing 16 for retaining the fitting 10 on the end portion of the pipe 12 (e.g., FIGS. 1-3, etc.). It is understood that the sleeve 20 may broadly be referred to as coupled to the housing 16 and/or the insert member 18 to support this movement.

A guide 62 is provided on the sleeve 20 for moving the sleeve to its first position (e.g., FIGS. 11 and 12, etc.) prior to connecting the fitting 10 to the end portion of the pipe 12. The guide 62 includes two upstanding legs 64 that each extend in a generally radial direction outwardly from an arm 58 of the sleeve 20, and an arcuate bridge 66 connecting the legs 64. The legs of the guide 62 are configured to move into a pair of correspondingly located openings 68 in the housing 16 when the fitting 10 is connected to the end portion of the pipe 12 (and the sleeve 20 is moved from its first position (e.g., FIGS. 11 and 12, etc.) to its second position (e.g., FIGS. 1-3, etc.)). The openings 68 allow the guide 62 to move beyond a forward edge 72 of the housing 16 so that the sleeve 20 can substantially completely be retracted within the housing when moved to its second position. Indicia 74 may be included on the housing 16 to indicate direction of movement of the guide 62 (and sleeve 20) relative to the housing to position the sleeve 20 in its first position prior to connecting the fitting 10 to the end portion of the pipe 12. In the illustrated fitting 10, the indicia 74 includes an arrow. Other indicia may be used within the scope of this disclosure. In addition, guides shaped and/or configured differently than illustrated and described herein may be used without departing from the scope of the disclosure.

Figure 11:
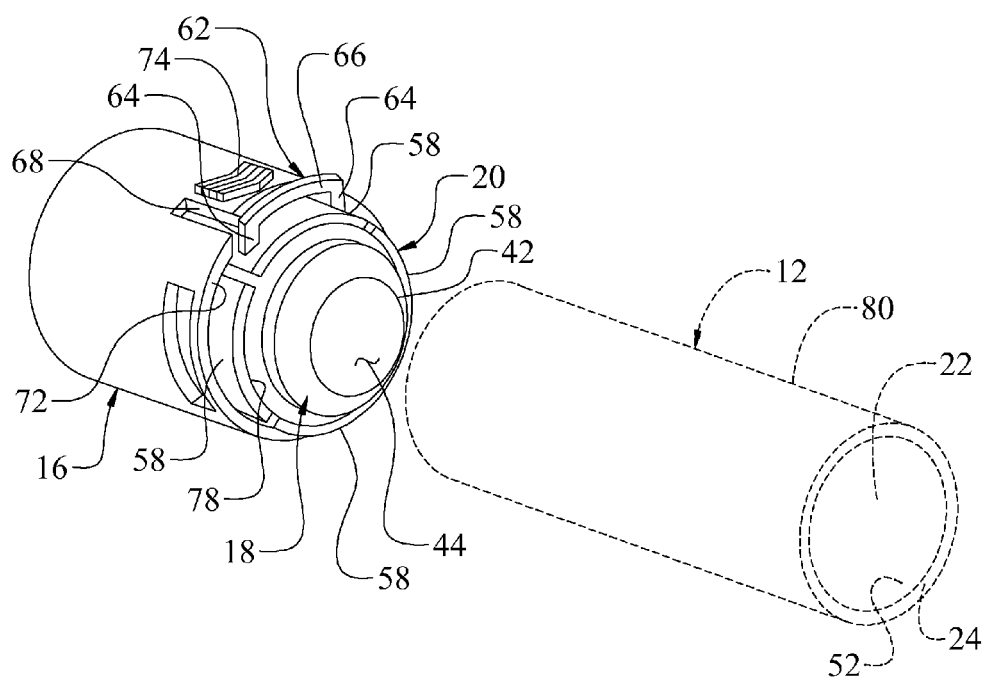
FIG. 11 is a perspective view of the fitting and the end portion of the pipe of FIG. 1 prior to connecting the fitting to the pipe.

With reference first to FIG. 11, the sleeve 20 is initially moved to its first position extending at least partly out of the housing 16. The fitting 10 may then be aligned generally with the end portion of the pipe 12 such that the forward opening 40 (FIG. 10) of the housing 16 generally faces the end portion of the pipe. Here, the longitudinal axis 26 (FIG. 5) of the fitting 10 may be generally aligned with a longitudinal 76 axis of the end portion of the pipe 12.

Figure 12:
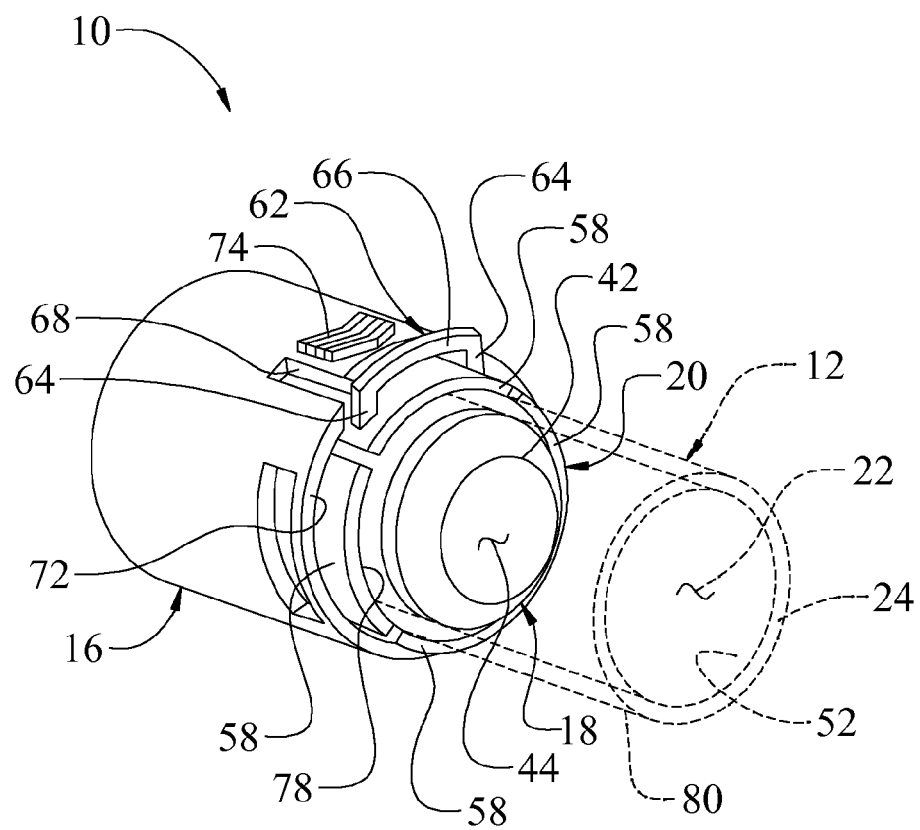
FIG. 12 is a perspective view similar to FIG. 11 with the fitting moved into engagement with the end portion of the pipe.

As shown in FIG. 12, connection continues by moving the fitting 10 toward the end portion of the pipe 12 so that the insert member 18 passes into, or slides into, the inner passageway 22 of the pipe. This moves the O-ring 48 into sealing engagement with the inner surface 52 of the pipe 12. As the fitting 10 further moves, or further slides, onto the pipe 12, the arms 58 of the extended sleeve 20 engage the wall 24 of the pipe and receive the end portion of the pipe 12 into the sleeve between the sleeve 20 and the insert member 18. The arms 58 of the sleeve 20 may resiliently flex (or move) outwardly in order to provide room within the sleeve 20 to receive the pipe 12. This movement of the arms 58 is generally allowed by the slots 60 between the arms. The arms 58 move over at least part of the end portion of the pipe 12, and inner surfaces 78 of the arms engage an outer surface 80 of the pipe. In this position of the fitting 10 on the pipe 12, at least part of the end portion of the pipe may seat against the lip 54 of the sleeve 20 so that continued movement of the fitting 10 onto the pipe 12 moves the fitting relative to both the pipe and the sleeve 20. Stated another way, as the pipe 12 slides into the fitting 10, it conjointly moves the sleeve 20 therewith so that both the pipe 12 and the sleeve 20 move relative to the housing 16 and the insert member 18.

Continued movement of the fitting 10 onto the pipe 12 moves the pipe and the sleeve 20 through the forward opening 40 of the housing 16. As previously stated, the thickness of the wall 24 of the pipe 12 combined with the thickness of the arms 58 of the sleeve 20 may be about equal to or slightly greater than the width dimension of the space 30 between the insert member 18 and the housing 16. Accordingly, as the pipe 12 and sleeve 20 move through the housing's forward opening 40, the housing 16 may compress, or inwardly cam, the outwardly flexed arms 58 of the sleeve 20 against the pipe 12. This provides room for the pipe wall 24 and the sleeve 20 to move into the space 30 between the insert member 18 and the housing 16. In addition, this presses the arms 58 of the sleeve 20 against the outer surface 80 of the pipe 12, which in turn presses the pipe 12 against the insert member 18 received within the pipe. The slots 60 between the arms 58 of the sleeve 20 again generally allow this movement. The fitting 10 may continue to move, or slide, onto the end portion of the pipe 12 until the lip 54 of the sleeve 20 is positioned adjacent the end wall 38 of the housing 16. As shown in FIGS. 1-3, the fitting 10 is now connected to the end portion of the pipe 12, and the sleeve 20 is moved to its second position retracted within the housing 16 and holding the fitting 10 on the pipe 12.

It should now be appreciated that when the fitting 10 is connected to the end portion of the pipe 12, the sleeve 20 and the wall 24 of the pipe are pressed or squeezed between the housing 16 and the insert member 18. The sleeve 20 generally holds the wall 24 of the pipe 12 within the fitting 10, and frictional forces between the insert member 18 and the wall 24 of the pipe 12, between the wall of the pipe 12 and the sleeve 20, and between the sleeve 20 and the housing 16 tend to resist movement of the fitting 10 off the end portion of the pipe 12.

The fitting 10 may be released from the end portion of the pipe 12, for example, by rotating the fitting 10 relative to the pipe 12 and conjointly pulling the fitting 10 longitudinally away from the pipe 12. This allows the fitting 10 to be released from the end portion of the pipe 12 so that the pipe may be adjusted (e.g., trimmed, moved, etc.), and then allows the fitting 10 to be re-connected to the pipe 12 for continued use.

In the illustrated embodiment, the cylindrical sleeve 20 (broadly, the retention member) is configured to fit within the housing 16 and over the insert member 18 for use in retaining the fitting on the end portion of the pipe 12. However, in other exemplary embodiments, retention members may include shapes other than cylindrical shapes. For example, in one embodiment, a fitting includes a retention member comprising a single shim positioned in a space between an insert member and a housing. The shim helps receive the fitting onto an end portion of a pipe and helps retain the fitting on the pipe. But in this embodiment, the shim does not extend around the insert member.

Figure 13:
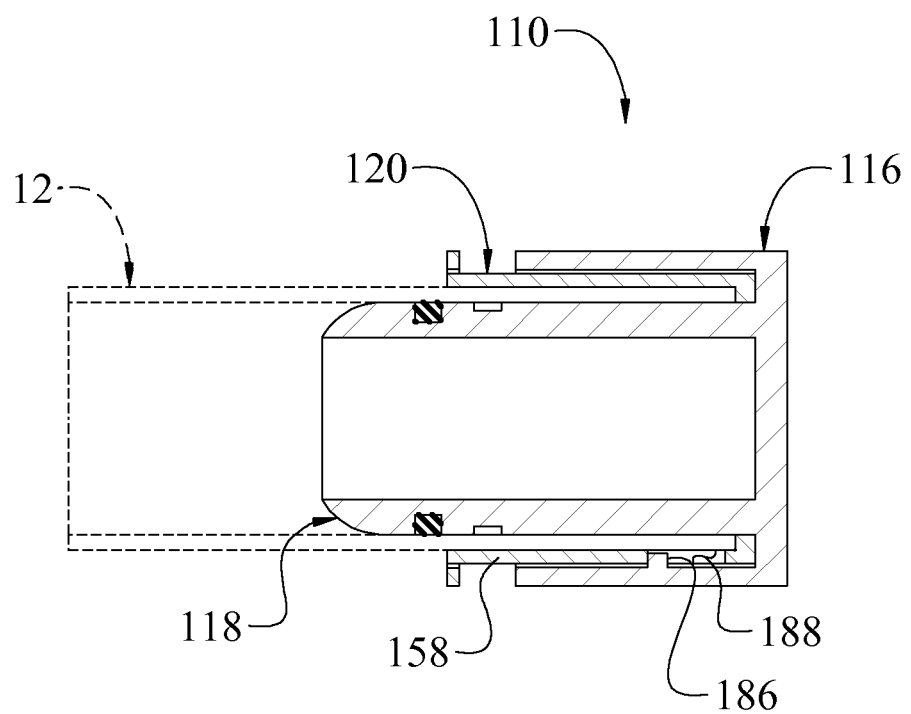
FIG. 13 is a longitudinal section view of another exemplary embodiment of a fitting shown connected to an end portion of a pipe, where the pipe is shown in phantom to illustrate the connected relationship.

FIG. 13 illustrates a fitting 110 according to another exemplary embodiment. The fitting 110 is shown in section connected to an end portion of a pipe 112 (the pipe is shown in phantom with broken lines). The fitting 110 generally includes a housing 116, an insert member 118, and a sleeve 120. Both the insert member 118 and the sleeve 120 are disposed, at least partly, within the housing 116. And the sleeve 120 is disposed generally around the insert member 118 between the insert member and the housing 116. In this fitting 110, however, a catch 186 is provided on the housing 116 for help in coupling the sleeve 120 to the housing and for holding the sleeve in the housing 116 when the sleeve 120 moves toward its first position. The catch 186 aligns with a slot 188 in an arm 158 of the sleeve 120 to allow the sleeve to slide within the housing 116 between its first position and its second positions. As shown in FIG. 13, when the sleeve 120 is in its second position, the catch 186 is adjacent a forward end of the slot 188. The catch 186 engages a rearward end of the slot 188 when the sleeve 120 moves to its first position so as to hold the sleeve against sliding out of the housing 116. In other exemplary embodiments, fittings may include sleeves with catches formed thereon and housings with corresponding slots for receiving the catches.

Figure 14:
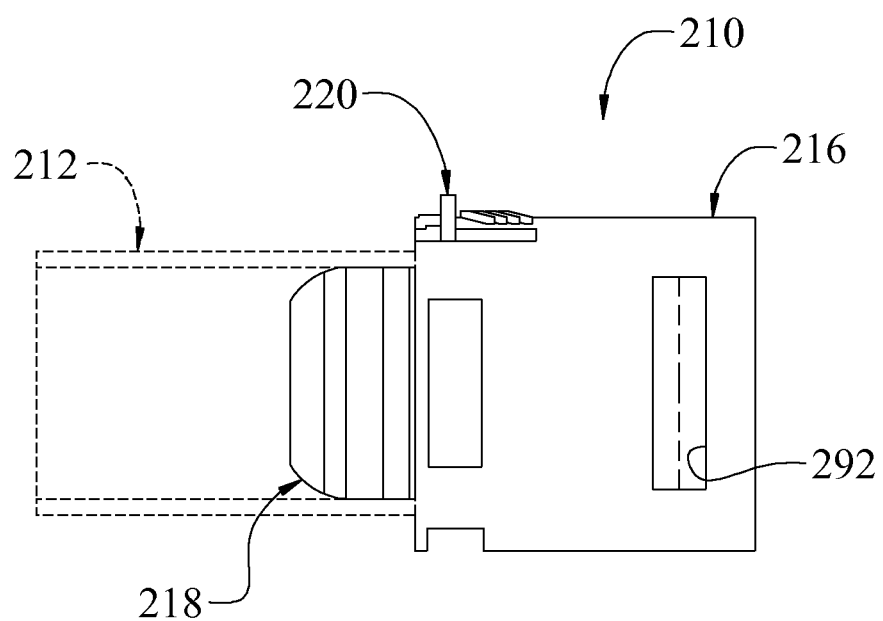
FIG. 14 is a side elevation view of still another exemplary embodiment of a fitting shown connected to an end portion of a pipe, where the pipe is shown in phantom to illustrate the connected relationship.

FIG. 14 illustrates a fitting 210 according to still another exemplary embodiment. The fitting 210 is shown connected to an end portion of a pipe 212 (the pipe is shown in phantom with broken lines). The fitting 210 generally includes a housing 216, an insert member 218, and a sleeve 220. Both the insert member 218 and the sleeve 220 are disposed, at least partly, within the housing 216. And the sleeve 220 is disposed generally around the insert member 218 between the insert member and the housing 216. In this fitting 210, the housing 216 includes openings 292 adjacent a rear end wall 238 of the housing for indicating proper insertion of the end portion of the pipe 212 into to the fitting. As shown in FIG. 14, when the fitting 210 is connected to the end portion of the pipe 212, at least part of the end portion of the pipe 212 is visible through the openings 292. In the illustrated fitting 210, the housing 216 includes two openings 292, one on each lateral side of the housing 216. However, only one opening 292 is visible in FIG. 14. In other exemplary embodiments, fittings may include housings with less than or more than two openings for helping to indicate proper insertion of end portions of pipes into the fittings.

Figure 15:
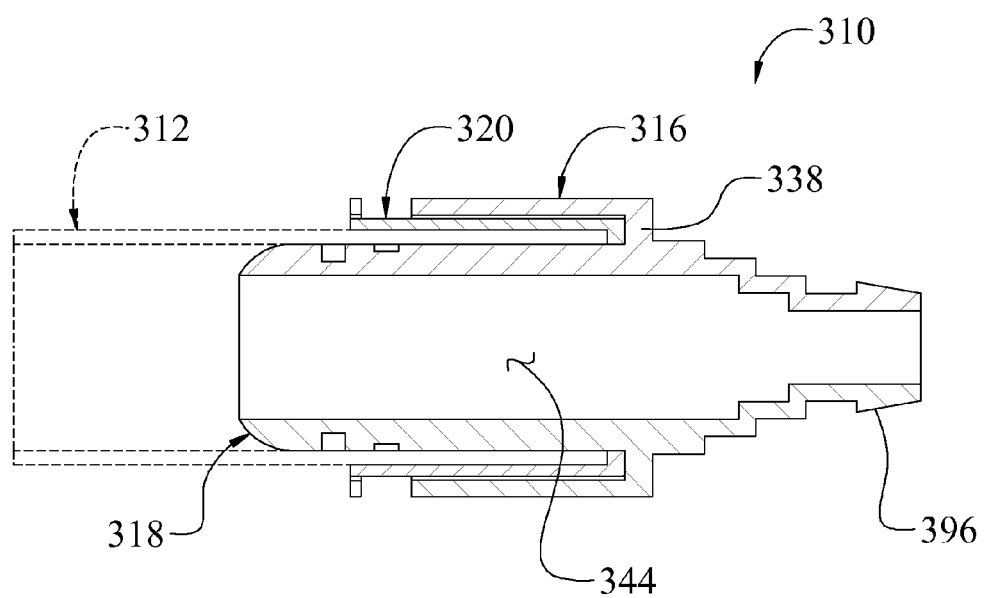
FIG. 15 is a longitudinal section view of yet another exemplary embodiment of a fitting shown connected to an end portion of a pipe, where the pipe is shown in phantom to illustrate the connected relationship.

FIG. 15 illustrates a fitting 310 according to yet another exemplary embodiment. The fitting 310 is shown in section connected to an end portion of a pipe 312 (the pipe is shown in phantom with broken lines). The fitting 310 generally includes a housing 316, an inert member 318, and a sleeve 320. Both the insert member 318 and the sleeve 320 are disposed, at least partly, within the housing 316. And the sleeve 320 is disposed generally around the insert member 318 between the insert member and the housing 316. In this fitting 310, the insert member 318 is generally tubular in shape and includes an interior passage 344 extending through the insert member 318. In addition, the housing 316 is generally open at its rearward end wall 338 where the insert member 318 connects to the housing 316 so that fluid may flow through the fitting 310 (e.g., through the interior passage 344 of the insert member 318, etc.).

As shown in FIG. 15, the rearward end wall 338 of this fitting 310 includes a barbed connector 396 that may be used, for example, for connecting the fitting 310 to an irrigation line (not shown). The irrigation line may be flexible and may be slid over the connector 396 for fluidly linking (or connecting) the irrigation line to the pipe 312. In other exemplary embodiments, fittings may include housings with connectors shaped differently for fluidly linking one pipe to another pipe, fluid carrying line, etc. In still other exemplary embodiments, fittings may include two or more housings, insert members, and sleeves for interconnecting two or more pipes. For example, a fitting may include three corresponding housings, insert members, and sleeves fluidly connected and oriented in a generally T-shape, Y-shape, etc. Each corresponding housing, insert member, and sleeve may be connected to an end portion of a pipe such that three different pipes may be fluidly connected to the fitting.

Figure 16:
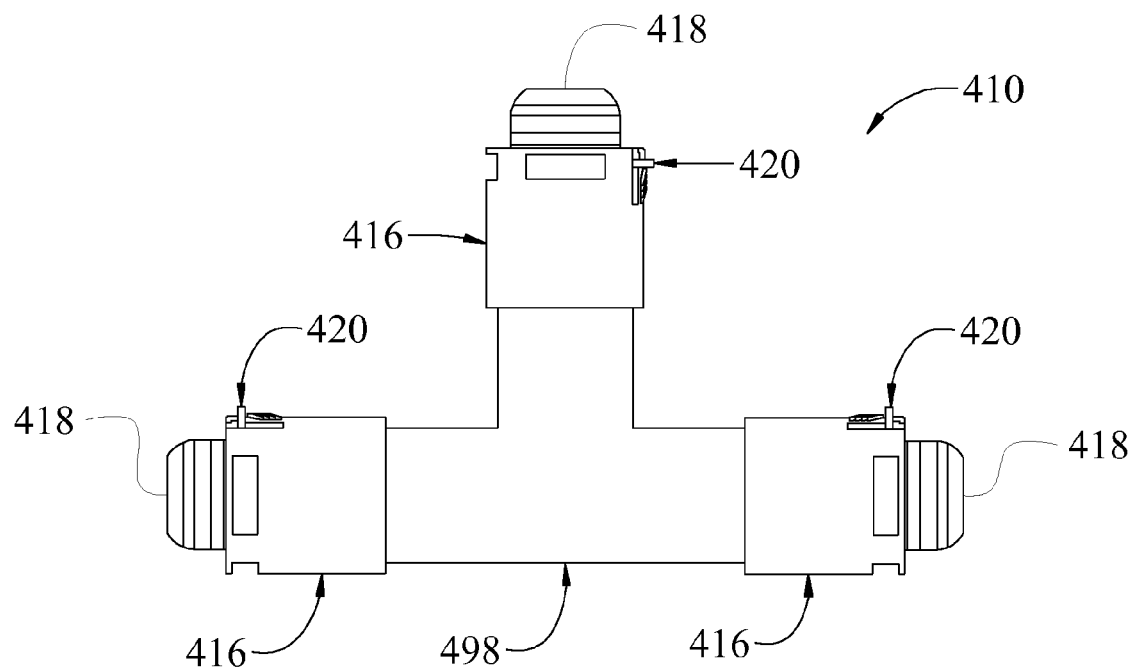
FIG. 16 is a top side elevation view of another exemplary embodiment of a fitting.

FIG. 16 illustrates a fitting 410 according to another exemplary embodiment. In this embodiment, the fitting is generally T-shaped and generally includes a T-shaped base 498, three housings 416, three insert members 418, and three sleeves 420. A housing 416, insert member 418, and sleeve 420 are disposed at each end of the base 498. Each end of the T-shaped fitting 410 may be connected to an end portion of a pipe as previously disclosed herein so that three pipes may be fluidly interconnected by the fitting 410. Fluid may flow through each pipe and through the fitting 410. Fittings may have other than T-shapes within the scope of the present disclosure. For example, fittings may have Y-shapes, H-shapes, etc.

Figure 17:
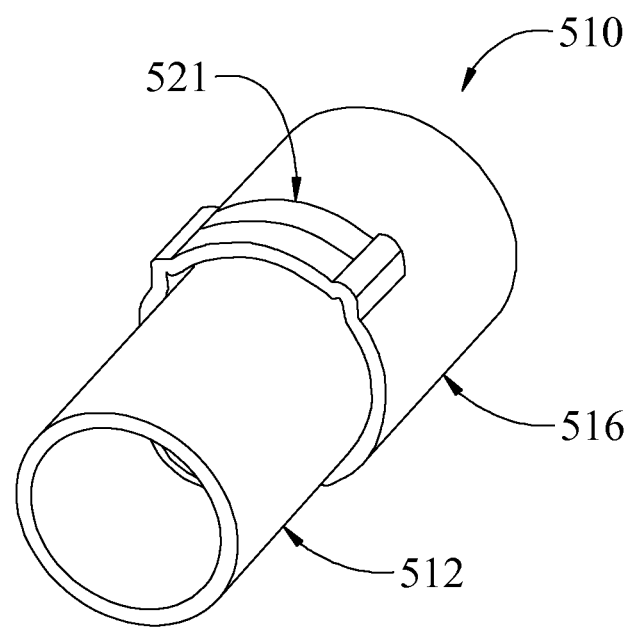
FIG. 17 is a perspective view of a further exemplary embodiment of a fitting shown connected to an end portion of a pipe.
Figure 18:
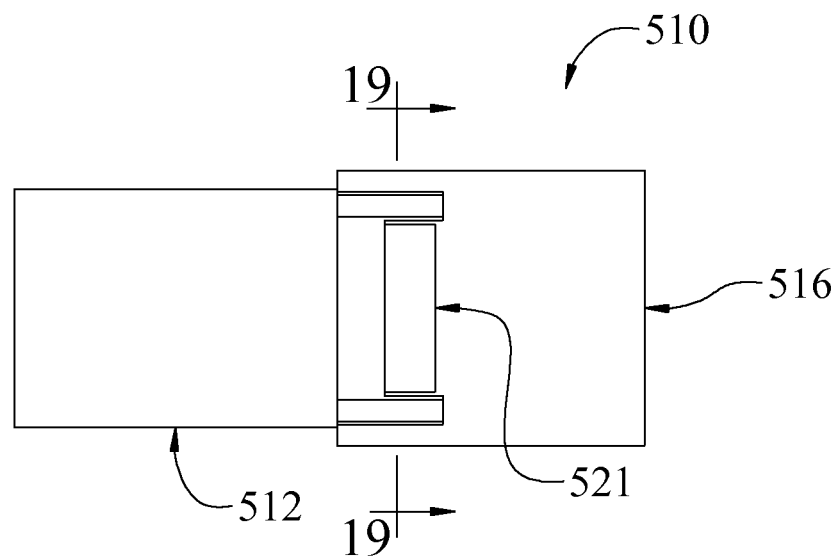
FIG. 18 is a top plan view of the fitting of FIG. 17.
Figure 19:
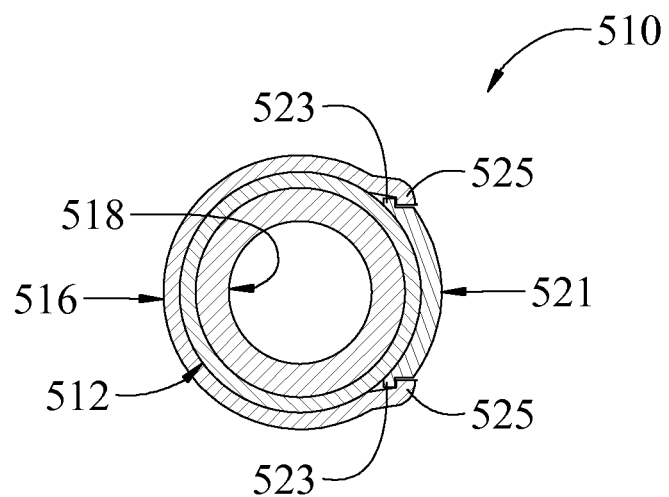
FIG. 19 is a section view thereof taken in a plane including line 19-19 shown in FIG. 18.

FIGS. 17-19 illustrate a fitting 510 according to a further exemplary embodiment. The fitting 510 is shown connected to an end portion of a pipe 512 and generally includes a housing 516, an insert member 518, and a retention member 521. The retention member 521 is positioned within an opening in the housing 516 and is movable relative to the housing. As shown in FIG. 19, latches 523 at opposing ends of the retention member 521 are configured to engage corresponding latches 525 at opposing ends of the housing opening to limit this relative movement and retain the retention member 521 in the housing 516. The latches 523 and 525 allow the retention member 521 to move radially inward into the housing 516, but also hold the retention member 521 against movement out of the housing.

When the fitting 510 connects to the end portion of the pipe 512 in this embodiment, the end portion of the pipe engages the retention member 521 and forces it radially outward of the housing 516 so that the pipe may move into the housing over the insert member 518. The latches 523 and 525, however, limit the outward movement of the retention member 521 and hold the retention member in engagement with the end portion of the pipe 512. The retention member 521 thus presses at least part of the inserted pipe against the insert member 518 for, at least partly, releasably retaining (e.g., frictionally retaining, etc.) the fitting 510 on the end portion of the pipe 512.

Figure 20:
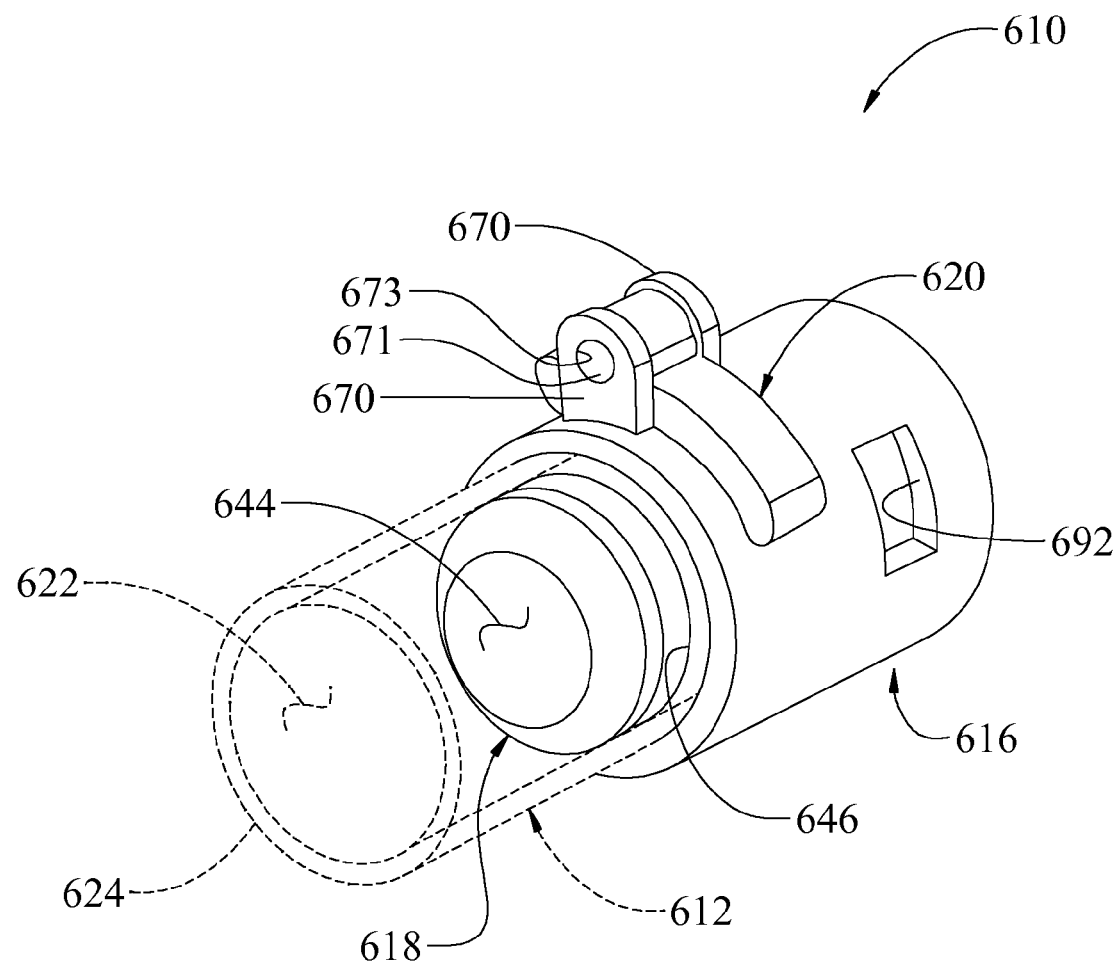
FIG. 20 is a perspective view of another exemplary embodiment of a fitting shown connected to an end portion of a pipe with the pipe shown in phantom to illustrate the connected relationship.
Figure 21:
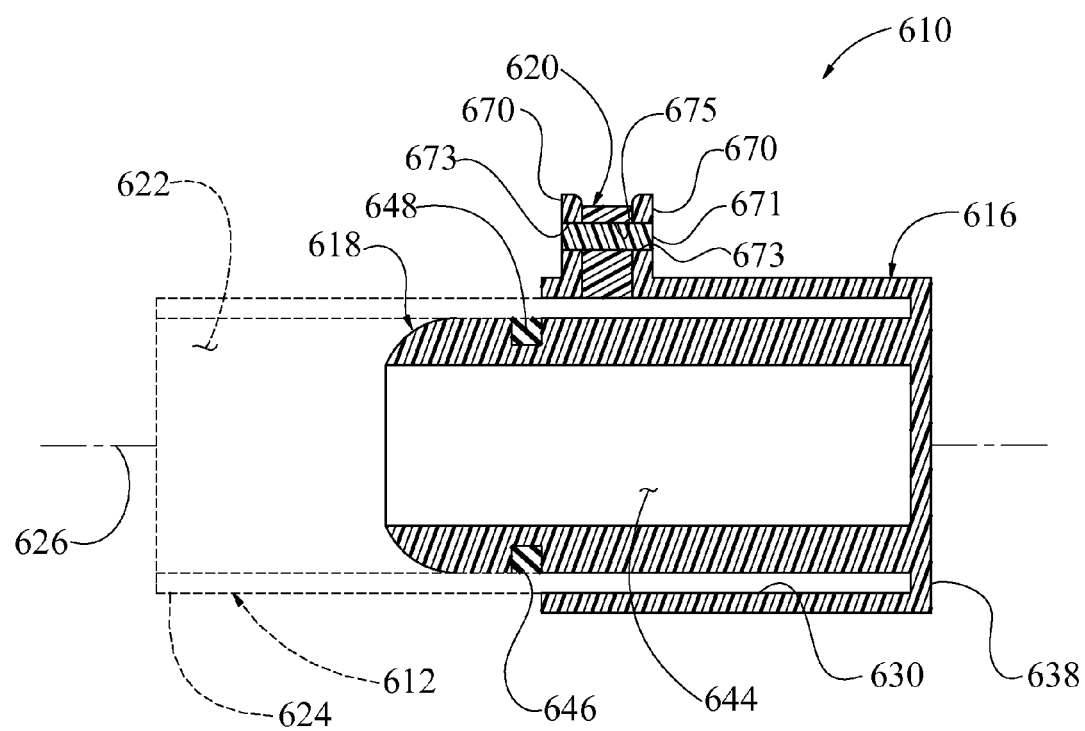
FIG. 21 is a longitudinal section of the fitting of FIG. 20.

FIGS. 20-26 illustrate a fitting 610 according to another exemplary embodiment. In FIGS. 20 and 21, the fitting 610 is shown connected to an end portion of a pipe 612. The end portion of the pipe 612 is shown in phantom (with broken lines) to illustrate the connection between the fitting 610 and the pipe 612. The illustrated fitting 610 may be used to generally close off, terminate, etc. the end portion of the pipe 612. In other exemplary embodiments, fittings may be used, for example, for connecting two or more pipes together; for connecting pipes to irrigation sprinklers; for connecting pipes to valves; for connecting pipes to other dissimilar tubing, pipes, etc.; etc.

Figure 22:
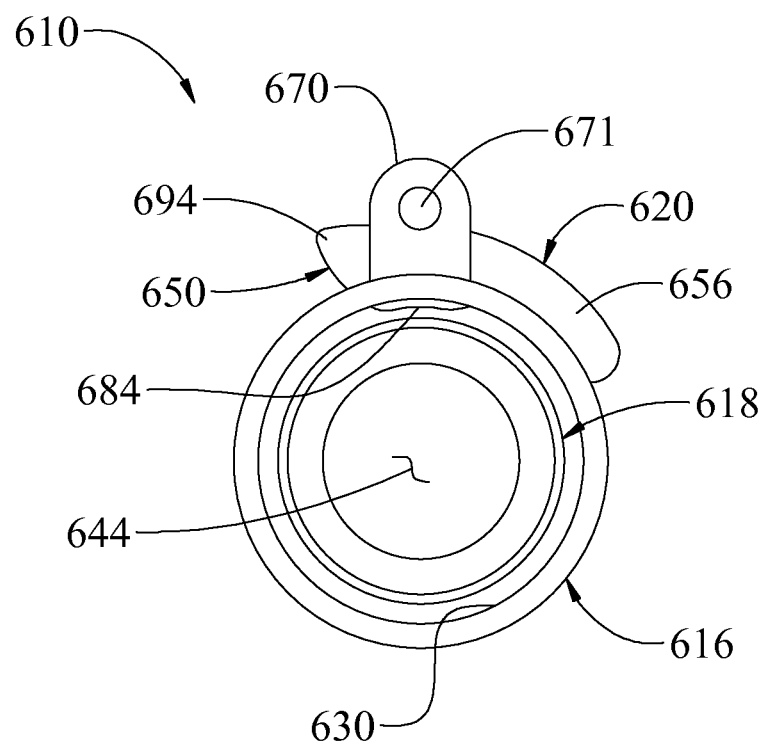
FIG. 22 is a forward end elevation view of the fitting of FIG. 20 with the pipe removed.

With additional reference to FIG. 22, the fitting 610 generally includes a housing 616 (e.g., a casing, etc.), an insert member 618, and a lever 620 (broadly, a retention member). The housing 616 and insert member 618 are generally cylindrical in shape. And the insert member 618 is disposed at least partly within the housing 616, generally concentrically with the housing 616 such that the housing and the insert member 618 may have a common longitudinal axis 626 (FIG. 21). This axis 626 is also a longitudinal axis of the fitting 610. In addition, a space 630 (FIG. 22) defined within the housing 616 between the housing 616 and the insert member 618 is generally uniform in width. The width of this space 630 may be about equal to a thickness of a wall 624 of the pipe 612 to which the fitting 610 is to be connected. The pipe wall 624 may thus be received into the space 630 between the housing 616 and insert member 618 when the fitting 610 is connected to the pipe 612. The space 630 may be larger or smaller than a thickness of a wall of a pipe within the scope of the present disclosure. The housing 616 and insert member 618 may broadly be referred to as a body of the fitting 610. But a fitting body should not be interpreted to require both a housing and an insert member. In other exemplary embodiments, for example, a fitting may include a body having only a housing or only an insert member. The fitting could include more than one lever within the scope of the present disclosure. For example, two or more levers could be coupled to a housing of the fitting.

The insert member 618 connects to an end wall 638 (FIG. 21) of the housing 616 at a rearward, closed end of the housing 616. The insert member 618 extends forward from the end wall 638 and passes out of the housing 616 at a forward, open end of the housing 616 generally opposite the end wall 638. In the illustrated fitting 610, the insert member 618 is formed integrally, or monolithically, with the end wall 638 such that the insert member 618 is integral, or monolithic, with the housing 616. This may be accomplished by forming the housing 616 and insert member 618 from one piece of material using, for example, an acceptable molding process, other acceptable fabrication process, etc. In other exemplary embodiments, fittings may include insert members formed separately from housings and attached thereto. In still other exemplary embodiments, fittings may include insert members that are disposed substantially within housings such that the insert members do not pass out of the housings at forward ends of the housings.

The illustrated insert member 618 includes an interior passage 644 extending longitudinally through the insert member 618. The insert member 618 is closed at its rearward end where the passage 644 meets the end wall 638 of the housing 616 so that fluid may not pass through the insert member 618 (or through the housing 616). A forward end of the insert member 618 may be open, and is configured (e.g., tapered, rounded, etc. in shape) for facilitating movement of the insert member 618 into the pipe 612 when the fitting 610 is connected to the pipe 612. A channel or groove 646 is formed around a periphery of the insert member 618 at its forward end for receiving a sealing member 648, such as an O-ring, over the insert member 618 (FIG. 21). The O-ring may provide a sealing connection between the insert member 618 (and fitting 610) and the pipe 612.

Figure 23:
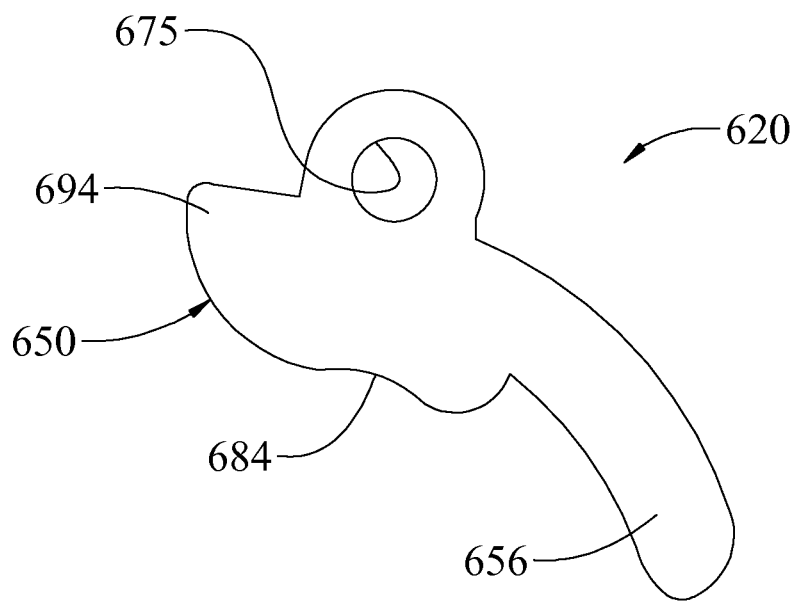
FIG. 23 is a side elevation view of a lever of the fitting of FIG. 20.
Figure 24:
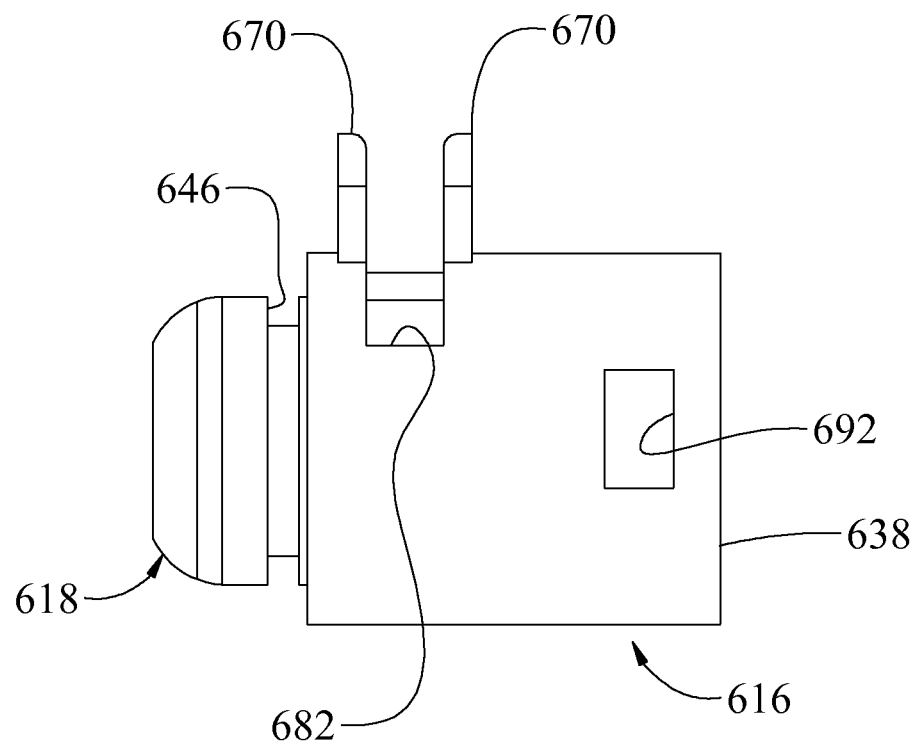
FIG. 24 is a side elevation view of a housing and insert member of the fitting of FIG. 20.

With further reference to FIGS. 23 and 24, the lever 620 and housing 616 of the fitting 610 are shown, respectively. The lever 620 includes a clamp 650 (e.g., shoulder, etc.) and an arm 656 extending away from one end of the clamp 650. The clamp 650 includes a free end 694 generally opposite the arm 656, and a depression 684 formed in a lower edge of the clamp 650. Levers may be shaped other than illustrated and described herein within the scope of the present disclosure.

The lever 620 connects to the housing 616 at upstanding lugs 670 on the housing 616. A pin 671 extends through openings 673 in the lugs 670 and through a corresponding opening 675 in the lever 620 to pivotally connect the lever 620 to the housing 616. In this connected position, the lever clamp 650 is positioned generally within an opening 682 in the housing 616 located generally between the lugs 670. And the depression 684 formed in a lower surface of the clamp 650 is positionable to engage the end portion of the pipe 612 received into the housing 616 to selectively connect the fitting 610 to the end portion of the pipe 612. Levers may be connected differently to housings, for example snap-connected, within the scope of the present disclosure.

Figure 25:
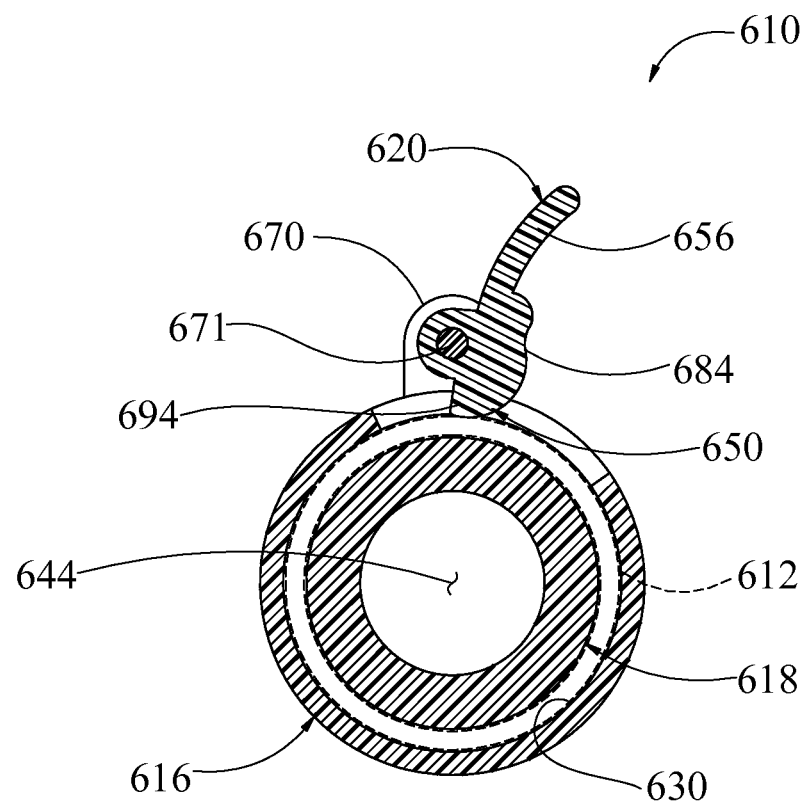
FIG. 25 is fragmentary forward end elevation view of the fitting of FIG. 20 with the pipe shown in phantom and with the lever in a position for receiving the pipe into the fitting.
Figure 26:
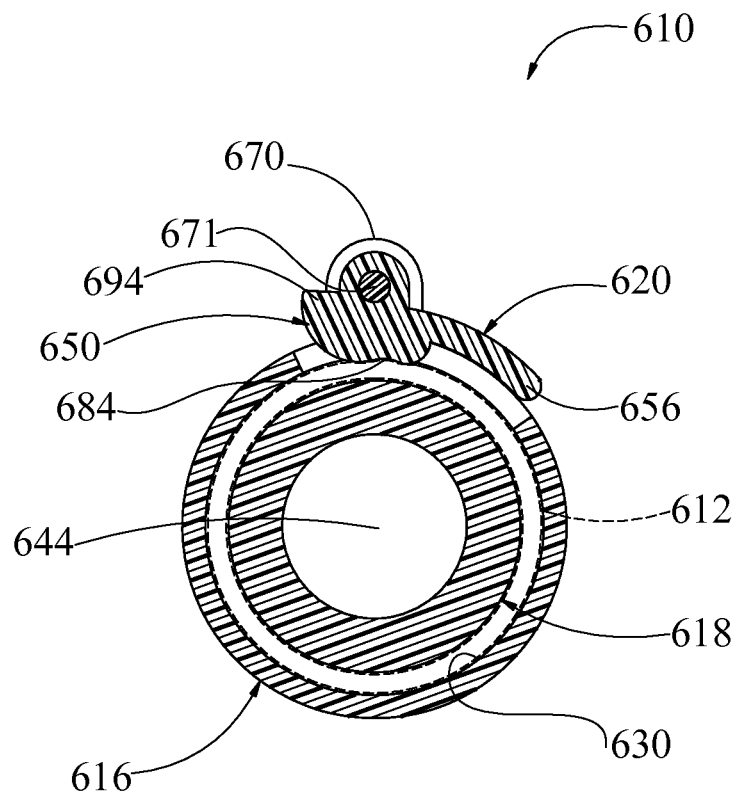
FIG. 26 is a view similar to FIG. 25 with the lever rotated to a position for retaining the fitting on the pipe.

As shown in FIGS. 25 and 26, the lever 620 is pivotable relative to both the housing 616 and the insert member 618 between, for example, a first, open position (FIG. 25) in which the fitting 610 may be installed to the end portion of the pipe 612 and a second, clamped position (FIG. 26) in which the installed fitting 610 may be retained on (is secured to) the end portion of the pipe 612. In the first, open position, the arm 656 of the lever 620 extends generally away from the housing 616 and the clamp 650 of the lever 620 is positioned substantially out of the housing 616, through the housing opening 682. In the second, clamped position, the arm 656 is substantially adjacent the housing 616 and the lever clamp 650 is positioned through the housing opening 682 at least partly within the space 630 between the housing 616 and the insert member 618. Here, the lever 620 may engage the end portion of the pipe 612 present within the space 630. The lever 620 may be configured (e.g., sized, shaped, constructed, etc.) differently such that the arm 656 is positioned differently relative to the housing 616 when, for example, the lever 620 is in the first, open and/or second, clamped positions within the scope of the present disclosure. For example, the arm 656 may be adjacent the housing 616 when the lever 620 is in the first, open position.

An exemplary process for connecting the fitting 610 to the end portion of the pipe 612 will now be described. The lever 620 is initially moved to its first, open position (FIG. 25) with the arm 656 of the lever 620 extending generally away from the housing 616 and the clamp 650 of the lever 620 moved substantially out of the housing opening 682. The fitting 610, initially disconnected from the pipe 612, may then be aligned generally with the end portion of the pipe 612 such that the insert member 618 generally faces the end portion of the pipe 612. This connection process continues by moving the fitting 610 toward the end portion of the pipe 612 so that the insert member 618 passes into, or slides into, an inner passageway 622 of the pipe 612. This, for example, can position the O-ring of the insert member 618 in sealing engagement with an inner surface of the pipe 612.

As the fitting 610 further moves (e.g., slides, etc.) onto the pipe 612, the pipe 612 moves into the housing 616 and into the space 630 between the housing 616 and the insert member 618, and past the clamp 650 of the lever 620. In some exemplary embodiments, the free end 694 of the lever clamp 650 may be positioned partly within the housing opening 682 when the lever 620 is in the first, open position. In some of these exemplary embodiments, the lever 620 may be configured to allow the end portion of the pipe 612 to move past the lever 620 without interference.

The fitting 610 may continue to move, or slide, onto the end portion of the pipe 612 until the end portion of the pipe 612 is positioned adjacent the end wall 638 of the housing 616. Openings 692 (only one is visible in the drawings) adjacent the end wall 638 may be used to indicate proper insertion of the pipe 612 into to the fitting 610. For example, the end portion of the pipe 612 may be visible through the openings 692 when the fitting 610 is properly installed to the end portion of the pipe 612. As previously stated, the thickness of the wall 624 of the pipe 612 may be about equal to the width dimension of the space 630 between the insert member 618 and the housing 616. Thus, frictional forces between the housing 616 and pipe 612 and between the insert member 618 and pipe 612 may help initially hold the fitting 610 on the pipe 612 when the lever 620 is still in the first, open position (FIG. 25).

To complete connection of the fitting 610 to the pipe 612, the lever 620 is moved (e.g., pivoted, etc.) from its first, open position (FIG. 25) to its second, clamped position (FIG. 26). The arm 656 of the lever 620 is moved toward the housing 616, which moves the clamp 650 of the lever 620 through the housing opening 682 and positions the depression 684 in the clamp 650 in engagement with at least part of the end portion of the pipe 612. The clamp 650 extends at least partly through the housing opening 682 to engage the end portion of the pipe 612 such that the depression 684 receives at least a portion of the pipe 612 in the depression 684. The lever clamp 650 (generally at the depression 684) presses (e.g., applies pressure to, etc.) at least part of the end portion of the pipe 612 against at least part of the insert member 618 to help retain the fitting 610 on the pipe 612 and help resist movement of the end portion of the pipe 612 off the fitting 610.

The housing 616 and insert member 618 are configured to cooperatively receive at least part of the end portion of the pipe 612 into the housing 616, and the lever 620 is configured to help retain the fitting 610 on the pipe 612. When the fitting 610 is retained on the end portion of the pipe 612, the lever 620 holds and/or presses at least part of the end portion of the pipe 612 against the insert member 618. For example, the clamp 650 of the lever 620 may frictionally engage the pipe 612 (generally at the clamp depression 684) and/or deform the pipe 612 inwardly (generally at the clamp depression 684) to retain the fitting 610 on the pipe 612. In some exemplary embodiments, the insert member 618 may include a corresponding depression that accommodates inward deformation of the pipe 612 caused by the lever 620. In other exemplary embodiments, fittings may include levers that engage and deform end portions of pipes, but do not puncture/penetrate/extend through the pipes.

The illustrated fitting 610 may be released from the end portion of the pipe 612, for example, by moving (e.g., pivoting, etc.) the lever 620 from its second, clamped position (FIG. 26) to its first, open position (FIG. 25). This moves the lever clamp 650, and the depression 684 in the lever clamp 650, away from the end portion of the pipe 612 and allows the fitting 610 to be released/removed from the end portion of the pipe 612. The pipe 612 may then be, for example, adjusted (e.g., trimmed, moved, etc.), and the fitting 610 may then be re-connected to the pipe 612 for continued use.

Figure 27:
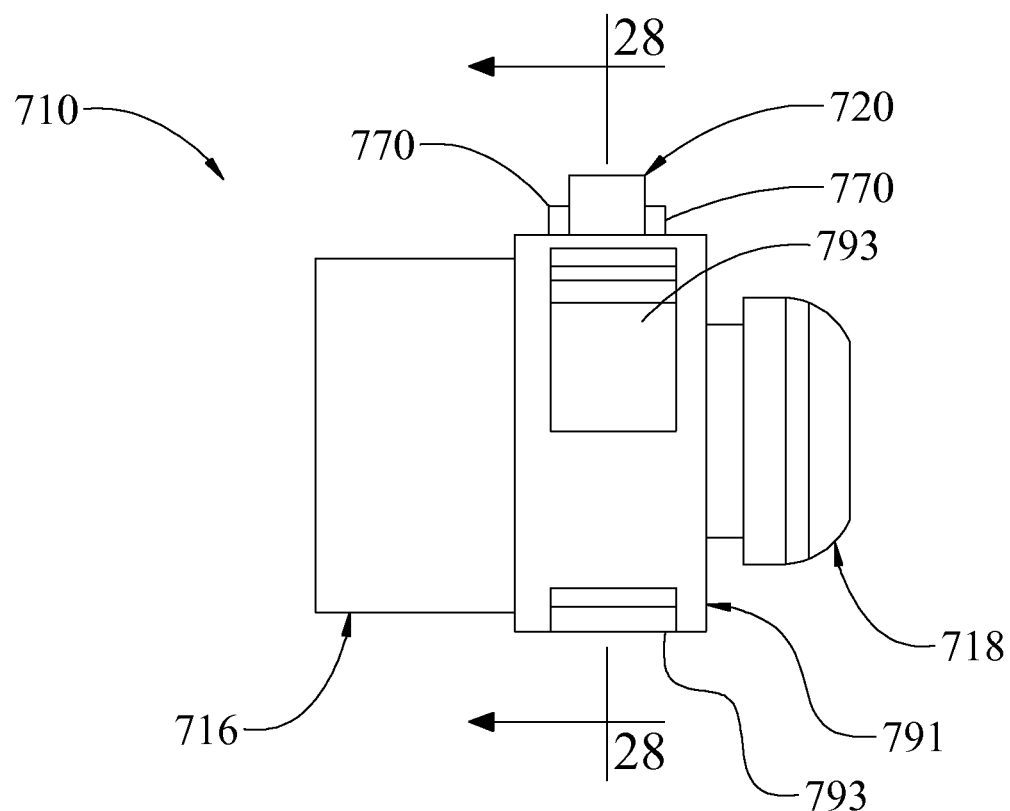
FIG. 27 is a side elevation view of still another exemplary embodiment of a fitting.
Figure 28:
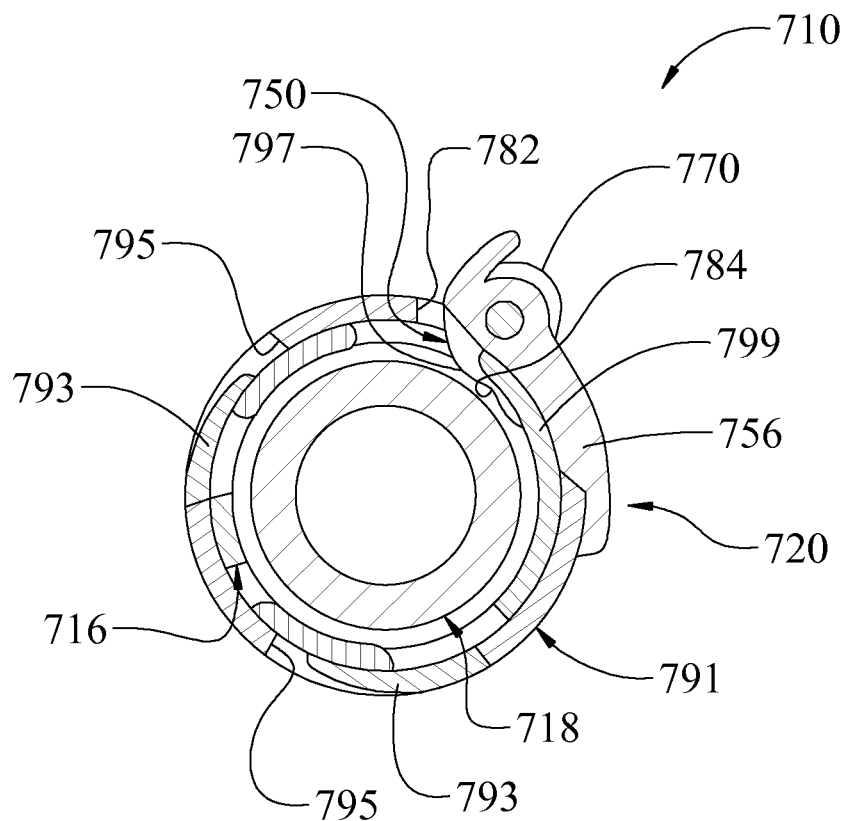
FIG. 28 is a section view taken in a plane including line 28-28 in FIG. 27 illustrating holding members in the fitting for use in helping retain the fitting on the pipe.

FIGS. 27 and 28 illustrate a fitting 710 according to still another exemplary embodiment. The fitting 710 of this embodiment is generally similar to the fitting 610 previously described and illustrated in FIGS. 20-26. The fitting 710 generally includes a housing 716, an insert member 718, and a lever 720. The insert member 718 is located at least partly within the housing 716. And the lever 720 is connected to the housing 716 at upstanding lugs 770 on the housing 716, with a clamp 750 of the lever 720 positioned at least partly in an opening 782 in the housing 716 generally between the lugs 770. In FIGS. 27 and 28, the lever 720 is shown in a second, clamped position with an arm 756 of the lever 720 adjacent the housing 716 and the clamp 750 of the lever 720 extending through the housing opening 782 in position to help retain the fitting 710 on an end portion of a pipe.

In this embodiment, the fitting 710 includes a cover 791 (or collar) extending around the fitting 710 at a location adjacent a forward end of the housing 716. Two holding members 793 extend from the cover 791 through openings 795 in the housing 716 such that the holding members 793 are each positioned at least partly within the housing 716. The holding members 793 may have ends that resiliently press at least part of an end portion of a pipe received into the housing 716 against the insert member 718. In other exemplary embodiments, fittings may include covers that extend only partly along a housing (e.g., half way around a housing, etc.) of the fitting. The holding members 793 may be formed differently within the scope of the present disclosure. For example, the holding members 793 may be formed separately from the cover 791 and attached thereto. In other exemplary embodiments, fittings may include holding members formed as part of housings.

Also in this embodiment, the clamp 750 of the lever 720 includes a pair of flanges 797 positioned at least partly in the housing opening 782. The opening 782 is divided by a tab 799 of the housing 716 to accommodate the flanges 797 such that each flange 797 extends though the opening 782 on opposite sides of the tab 799. Each flange 797 includes a depression 784 formed in a lower surface of the flange 797. The flange depressions 784 are engageable with an end portion of a pipe to selectively connect/retain the fitting 710 to the end portion of the pipe.

Figure 29:
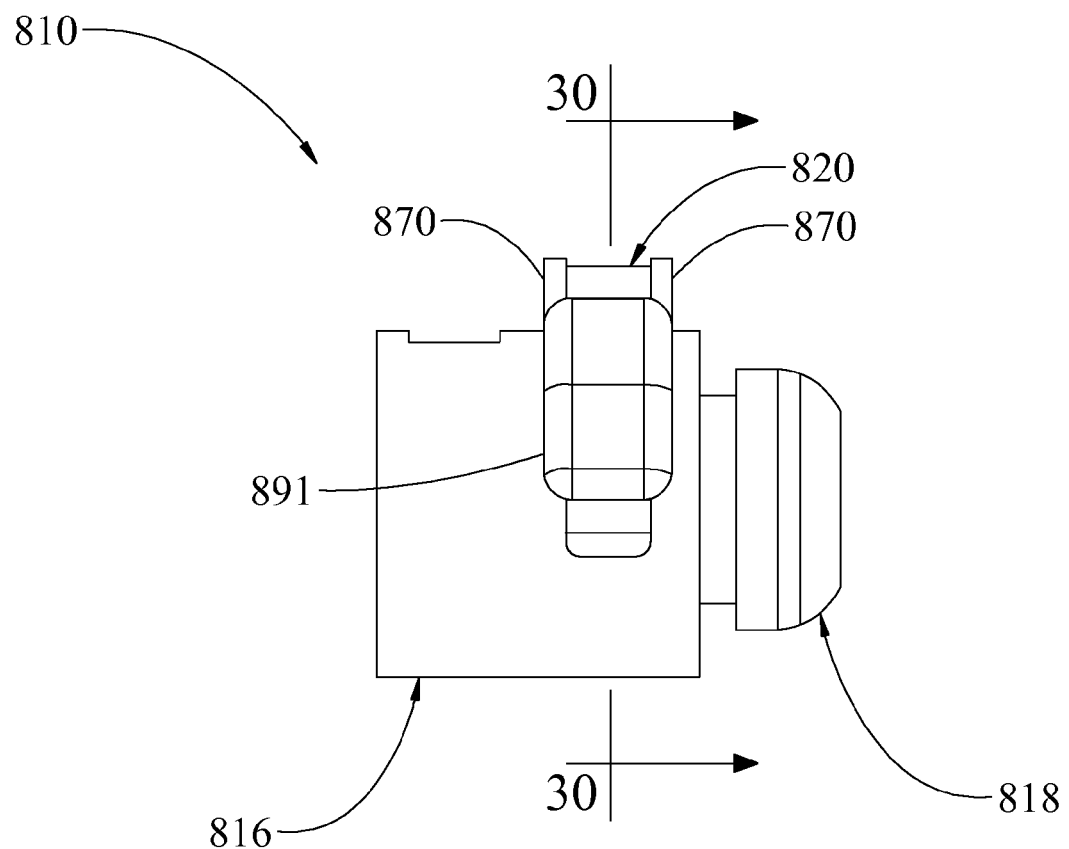
FIG. 29 is a side elevation view of a further exemplary embodiment of a fitting.
Figure 30:
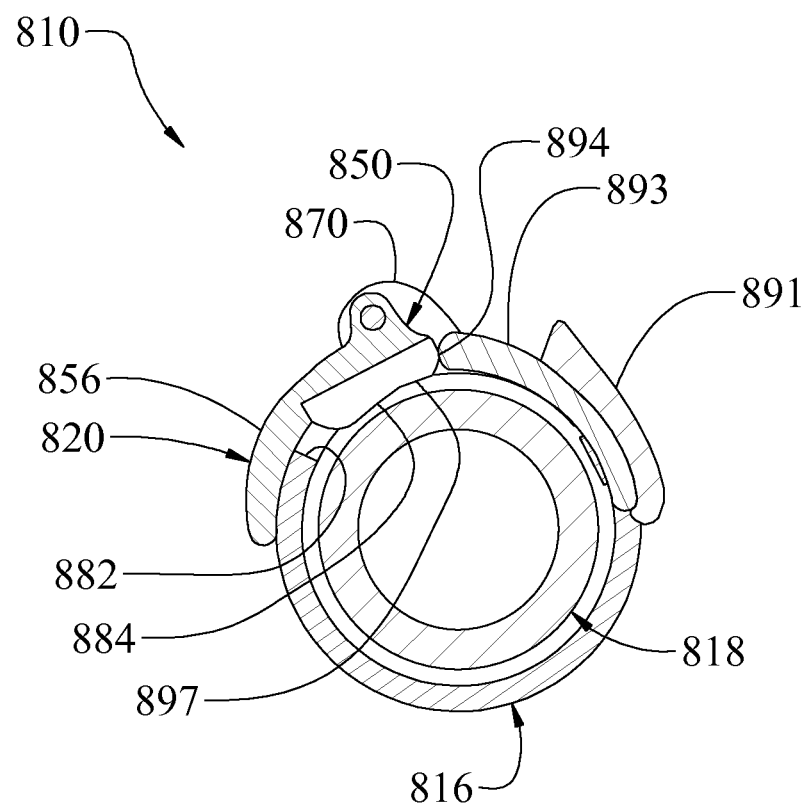
FIG. 30 is a section view taken in a plane including line 30-30 in FIG. 29.

FIGS. 29 and 30 illustrate a fitting 810 according to still another exemplary embodiment. The fitting 810 generally includes a housing 816, an insert member 818, and a lever 820. The insert member 818 is located at least partly within the housing 816. And the lever 820 is connected to the housing 816 at upstanding lugs 870 on the housing 816, with a clamp 850 of the lever 820 positioned at least partly in an opening 882 in the housing 816 generally between the lugs 870. In FIGS. 29 and 30, the lever 820 is shown in a second, clamped position with an arm 856 of the lever 820 adjacent the housing 816 and the clamp 850 of the lever 820 extending through the housing opening 882 in position to help retain the fitting 810 on an end portion of a pipe.

In this embodiment, the fitting 810 includes a cover 891 located adjacent a forward end of the housing 816. A holding member 893 is disposed within the cover 891 and extends from under the cover 891 through the housing opening 882 such that the holding member 893 is also located at least partly within the housing 816. The holding member 893 may be formed from a resilient material and may resiliently press at least part of an end portion of a pipe received into the housing 816 against the insert member 818. The holding member 893 may also help hold the lever 820 in the second, clamped position when retaining the fitting 810 on an end portion of a pipe. For example, in the illustrated fitting 810 a free end 894 of the lever clamp 850 is seated generally above an end of the holding member 893 such that the holding member 893 resists movement/rotation of the lever 820 toward the first, open position. But a user may grasp the lever 820 and move/pivot the free end 894 of the lever 820 past the holding member 893 when desired to, for example, remove the fitting 810 from the end portion of the pipe.

Also in this embodiment, the clamp 850 of the lever 820 includes a pair of flanges 897 positioned at least partly in the housing opening 882. Each flange 897 includes a depression 884 formed in a lower surface of the flange 897. The flange depressions 884 are engagable with an end portion of a pipe received into the housing 816 to selectively connect/retain the fitting 810 to the end portion of the pipe.

Figure 31:
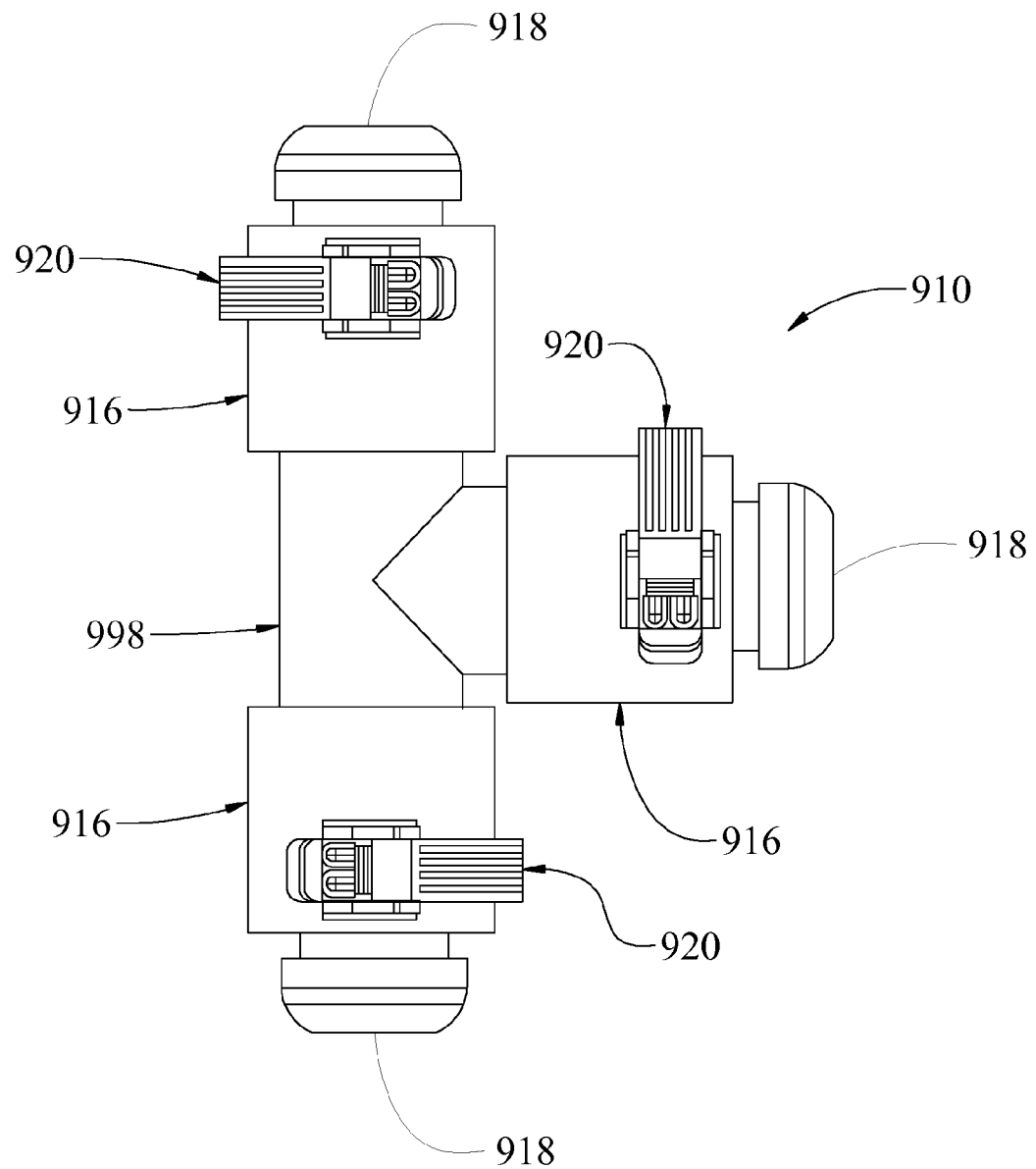
FIG. 31 is a top side elevation view of another exemplary embodiment of a fitting.

FIG. 31 illustrates a fitting 910 according to another exemplary embodiment. In this embodiment, the fitting is generally T-shaped and generally includes a T-shaped base 998, three housings 916, three insert members 918, and three levers 920. A housing 916, insert member 918, and lever 920 are disposed at each end of the base 998. Each end of the T-shaped fitting 910 may be connected to an end portion of a pipe so that three pipes may be fluidly interconnected by the fitting 910. Fluid may flow through each pipe and through the fitting 910. Fittings may have other than T-shapes within the scope of the present disclosure. For example, fittings may have Y-shapes, H-shapes, etc.

Figure 32:
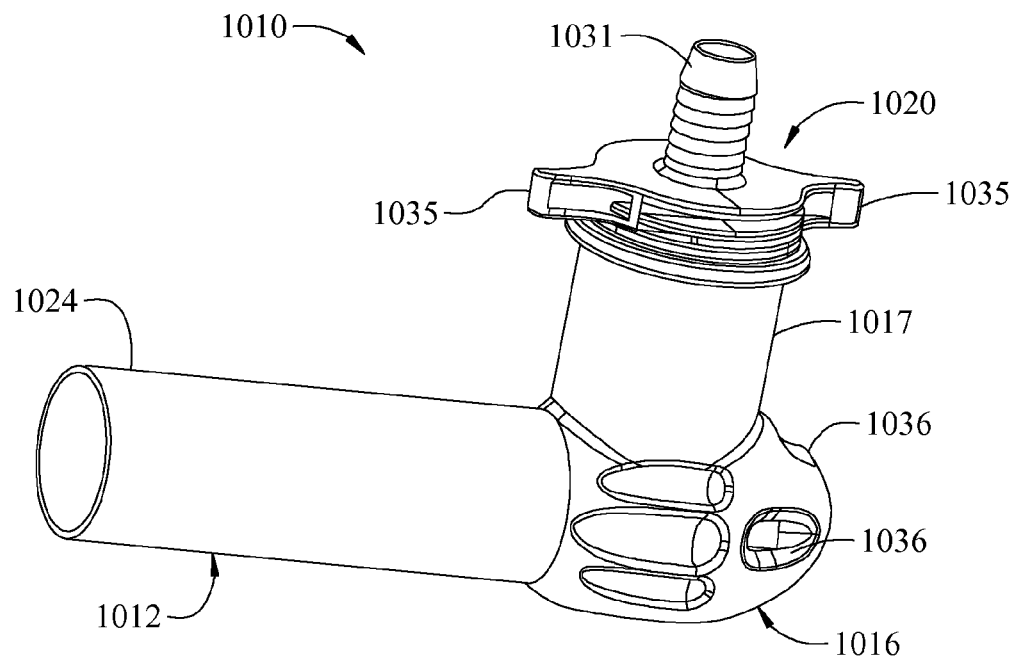
FIG. 32 is a perspective view of another exemplary embodiment of a fitting shown connected to an end portion of a pipe.
Figure 33:
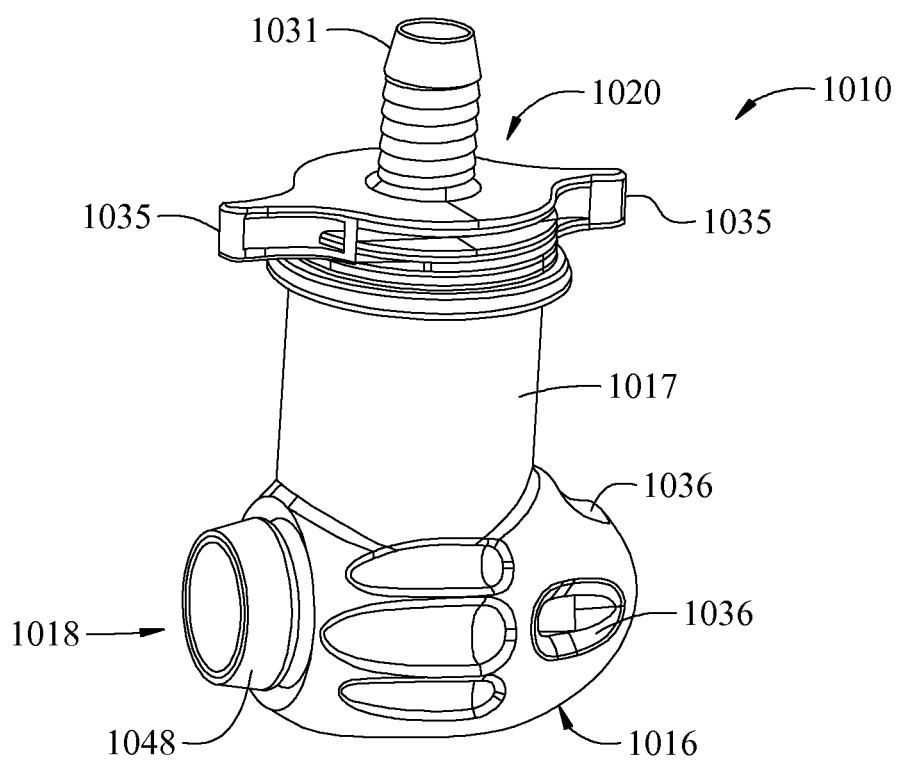
FIG. 33 is the perspective view of FIG. 32 with the end portion of the pipe removed.
Figure 34:
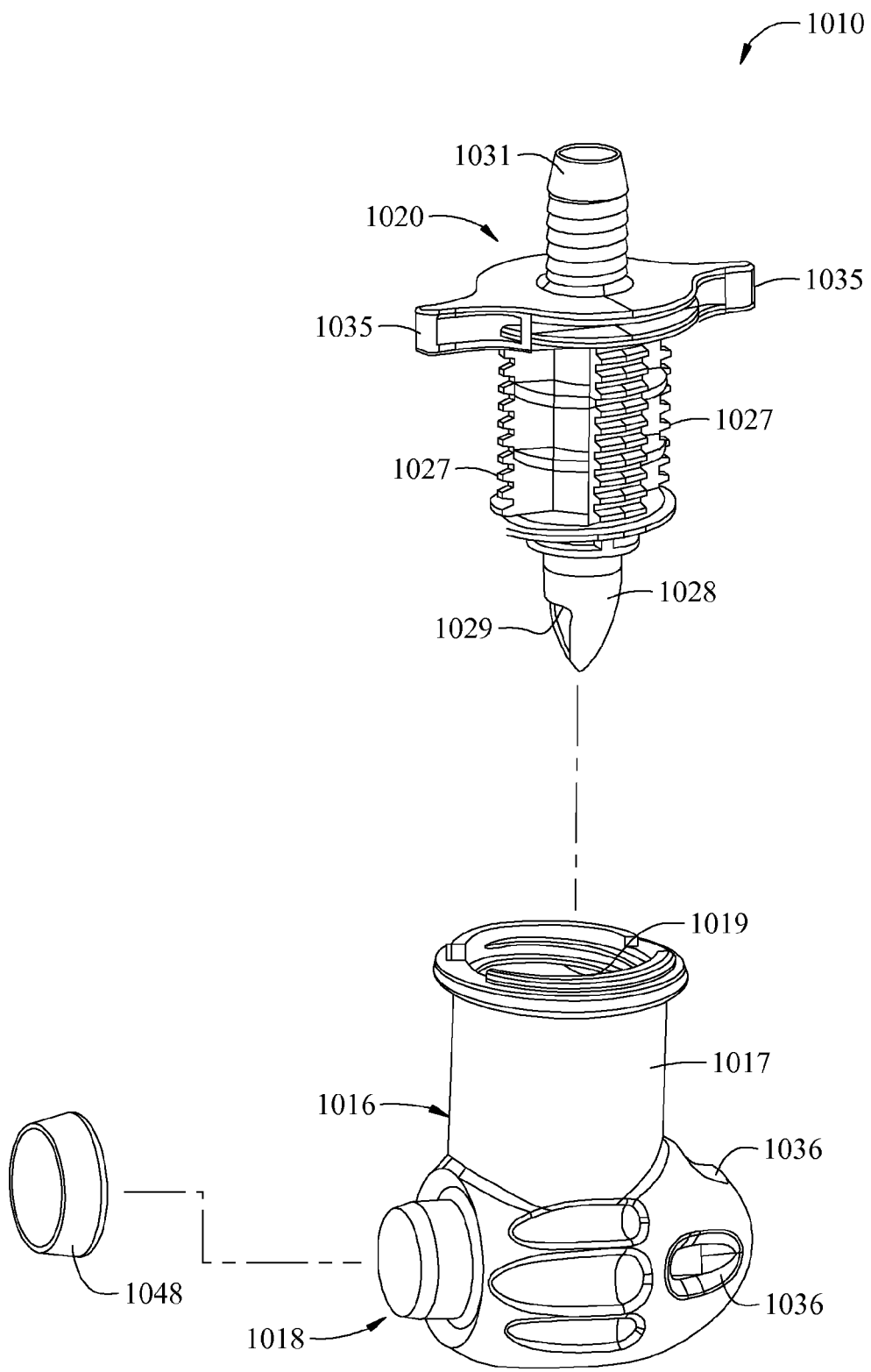
FIG. 34 is an exploded view of the fitting of FIG. 33.
Figure 35:
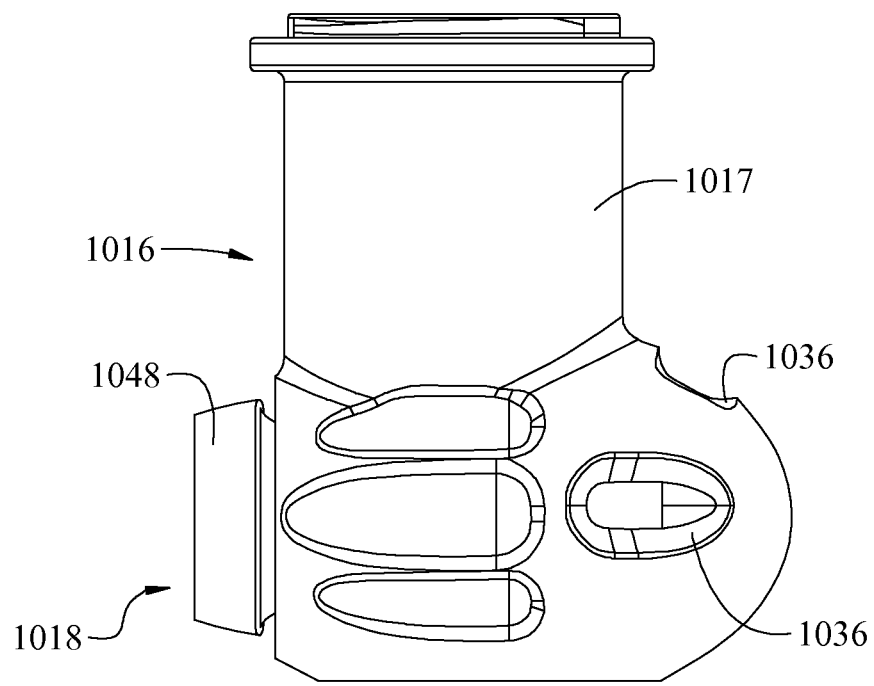
FIG. 35 is a side elevation view of a housing of the fitting of FIG. 32.
Figure 36:
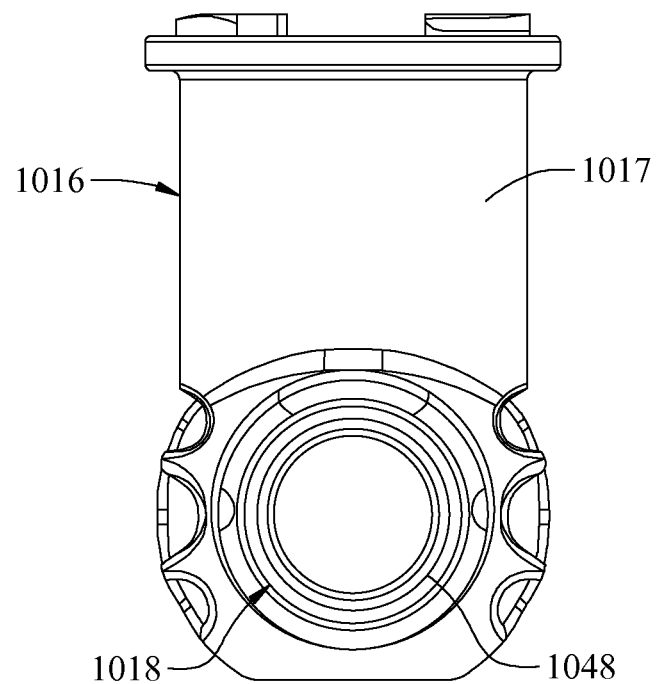
FIG. 36 is a front elevation view of the fitting housing of FIG. 32.
Figure 37:
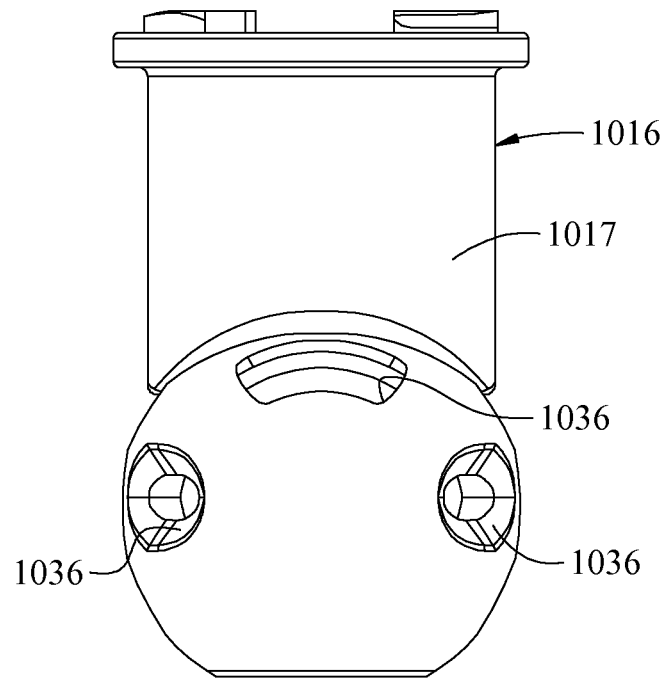
FIG. 37 is a rear elevation view of the fitting housing of FIG. 32.
Figure 38:
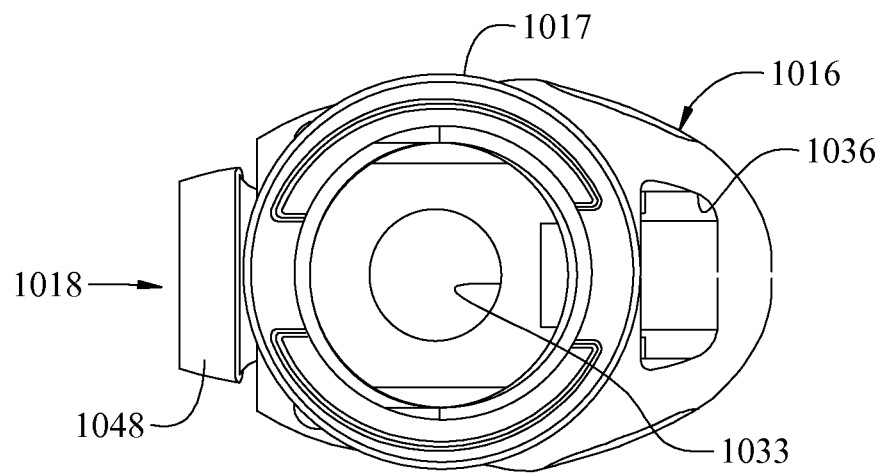
FIG. 38 is a top plan view of the fitting housing of FIG. 32.
Figure 39:
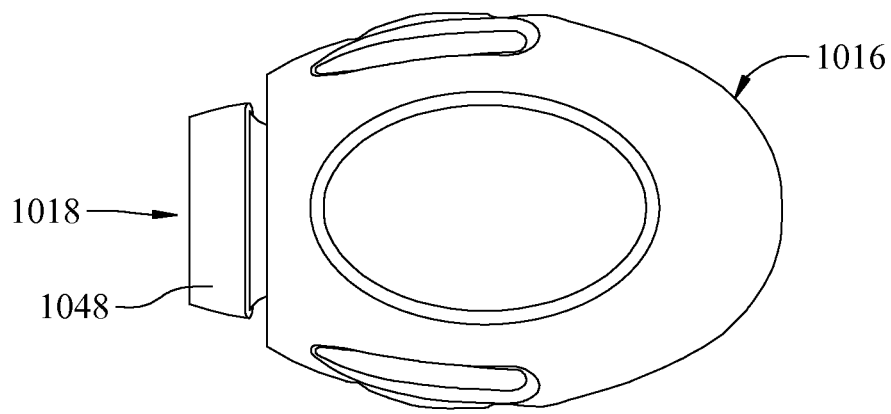
FIG. 39 is a bottom plan view of the fitting housing of FIG. 32.

FIGS. 32-43 illustrate a fitting 1010 according to another exemplary embodiment. As shown in FIGS. 32-34, the fitting 1010 generally includes a housing 1016 having an insert member 1018 disposed at least partly within the housing 1016, and a tap 1020 (broadly, a retention member) for selectively engaging an external portion of an end portion of a pipe 1012 for help in retaining the fitting 1010 on the pipe 1012. The illustrated housing 1016 is configured (e.g., sized, shaped, constructed, etc.) in a saddle configuration similar to a saddle tee (FIGS. 35-39). The housing 1016 may have other configurations within the scope of the present disclosure. The illustrated insert member 1018 is generally hollow; but the insert member 1018 could have a solid construction within the scope of the present disclosure. The housing 1016 and insert member 1018 may broadly be referred to as a body of the fitting 1010. But a fitting body should not be interpreted to require both a housing and an insert member. In other exemplary embodiments, for example, a fitting may include a body having only a housing or only an insert member.

The fitting 1010 includes a sealing member, such as an O-ring 1048, which can be positioned about the insert member 1018 to engage an interior surface of the pipe 1012 received into the housing 1016. The O-ring 1048 is configured (e.g., sized, shaped, constructed, etc.) to surround an outer surface of an end portion of the insert member 1018 and to compressively engage an inner surface of the end portion of the pipe 1012 received into the housing 1016 (and over the insert member 1018). This, in turn, provides a compressive sealing between the insert member 1018 and the inside of the pipe 1012 such that the O-ring 1048 can help seal the pipe 1012 against the fitting 1010 to help inhibit fluid from leaving, leaking from, etc. the pipe 1012 at the fitting 1010. Two or more O-rings may be used within the scope of the present disclosure.

In other exemplary embodiments, one or more sealing members may be positioned at locations within fitting housings such that sealing members engage outer surfaces of pipes received in the housings. Here, the sealing members may provide compressive engagements of the pipes between the housings and fitting insert members. In some exemplary embodiments, two or more sealing members may be provided in fittings so that at least one sealing member engages inner surfaces of pipes and at least one sealing member engages outer surfaces of the pipes. In still other exemplary embodiments, sealing members may be formed integrally with fitting housings and/or fitting insert members. In other exemplary embodiments, sealing members may be separate components from fittings, fitting housings, and/or fitting insert members. In still further exemplary embodiments, sealing members may include flexible or other sealing materials that are integrally molded or formed with the fitting housings and/or fitting insert members, such as by two shot molding or other suitable fabrication methods. In other exemplary embodiments, sealing members may include at least one flexible wiper blade positioned about fitting insert members for engaging pipes. In still other exemplary embodiments, sealing members may include at least one guard ring positioned about fitting insert members for engaging pipes.

With reference to FIGS. 35-39, the housing 1016 and the insert member 1018 are generally cylindrical in shape. And the insert member 1018 is disposed at least partly within the housing 1016, generally concentrically with the housing 1016. In addition, a space 1030 (FIG. 42) is defined within the housing 1016 between the housing 1016 and the insert member 1018. The space 1030 is configured (sized, shaped, constructed, etc.) for receiving at least part of the end portion of the pipe 1012 into the housing 1016, and over the insert member 1018. The illustrated insert member 1018 is integrally formed with a rearward portion of the housing 1016. A substantial length of the insert member 1018 is disposed within the housing 1016, and thus a substantial length of the insert member 1018 may be received into the end portion of the pipe 1012 when the fitting 1010 is connected to the pipe 1012. Once the end portion of the pipe 1012 is received into the housing 1016, the tap 1020 can help connect the fitting 1010 to the end portion of the pipe 1012.

The insert member 1018 may include a generally constant diameter along its length; the insert member 1018 may include an increasing diameter along its length from the rearward portion of the housing 1016 toward a forward portion of the housing 1016; the insert member 1018 may include a decreasing diameter along its length from the rearward portion of the housing 1016 toward the forward portion of the housing 1016; etc. In addition, the insert member 1018 may include an external surface that is barbed, stepped, rough, free of barbs, generally smooth, etc. within the scope of the present disclosure.

The housing 1016 includes an upper neck 1017 for use in receiving and/or coupling the tap 1020 to the housing 1016. In the illustrated embodiment, the upper neck 1017 includes interior threads 1019, and the tap 1020 includes exterior threads 1027. The threads 1027 of the tap 1020 are configured to mate with the threads 1019 of the housing's upper neck 1017 so that the tap 1020 can be threadingly received into and/or coupled to the housing 1016. In other exemplary embodiments, housings and retention members may include different structures for use in receiving the retention members into the housings, including, for example, lever systems, cam systems, snap-fit systems, etc. In still other exemplary embodiments, housings may include external threads, and retention members may include internal threads configured to mate with the external threads of the housings.

Figure 40:
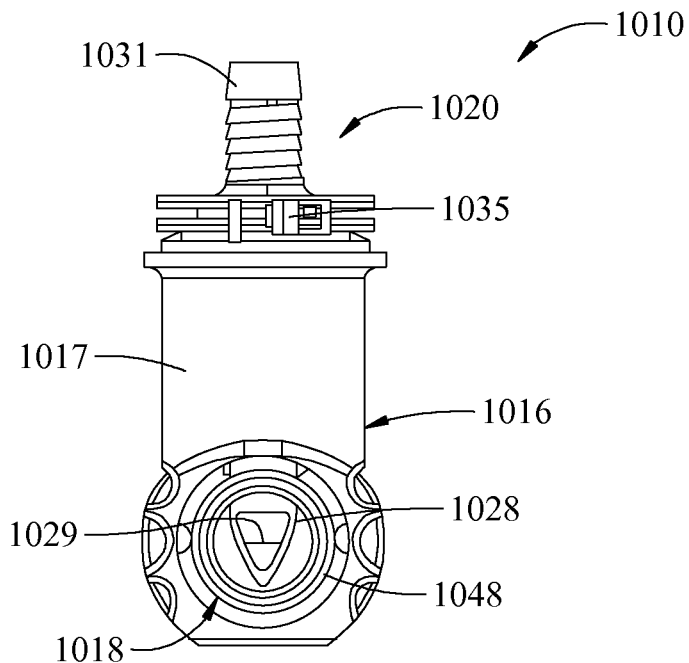
FIG. 40 is a front elevation view of the fitting of FIG. 33 illustrating the spike inserted into the housing.
Figure 41:
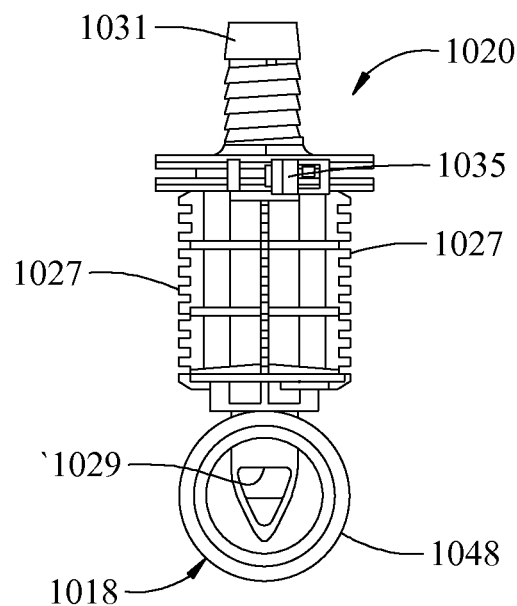
FIG. 41 is a fragmentary front elevation view similar to FIG. 40 with the housing removed.
Figure 42:
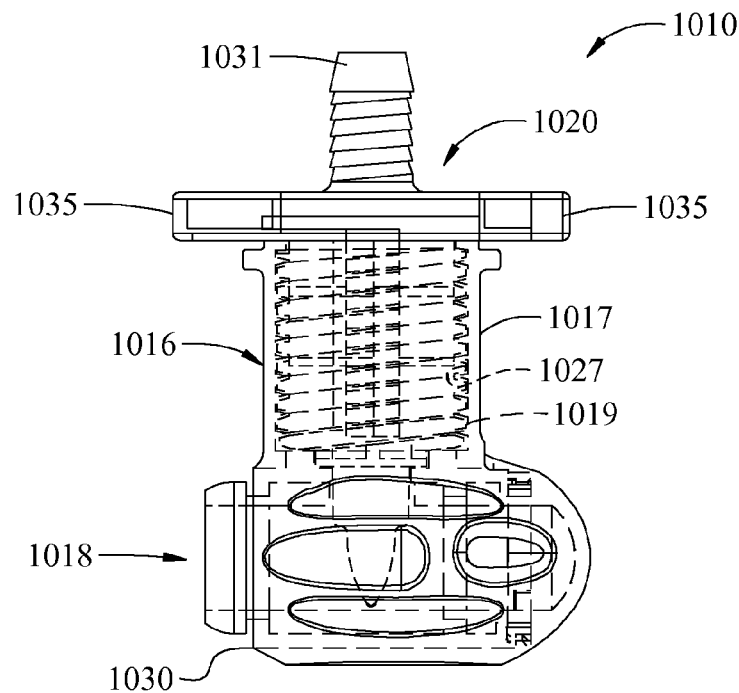
FIG. 42 is a fragmentary perspective view of the fitting of FIG. 33 with part of the housing broken away and with the spike inserted into the housing.
Figure 43:
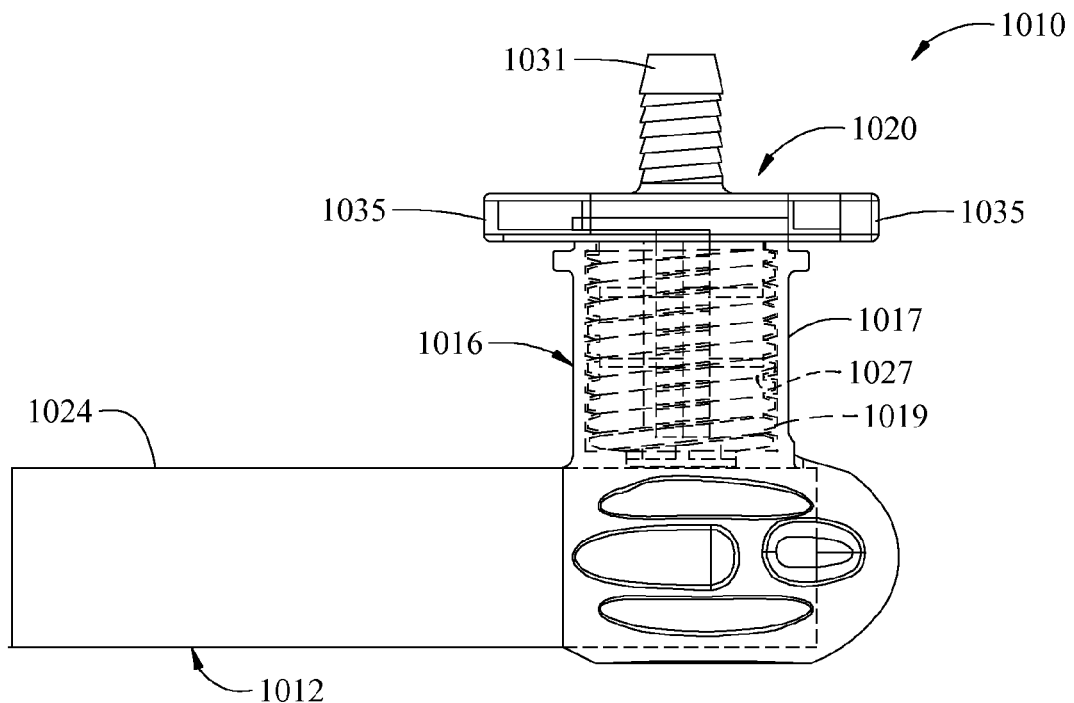
FIG. 43 is the view of FIG. 42 with the fitting illustrated connected to an end portion of a pipe.

As shown in FIGS. 34, 40, and 41, the illustrated tap 1020 includes a spike 1028 at a generally lower end of the tap 1020. The spike 1028 includes an inlet 1029 that leads to a channel (not visible), that in turn extends through the tap 1020 to an upper connector 1031. In the illustrated embodiment, when the tap 1020 is threaded into the housing 1016, the tap 1020 is configured to engage and penetrate a wall 1024 of the end portion of the pipe 1012 received in the housing 1016 (through opening 1033 in the insert member 1018 (FIG. 38)). The tap 1020 may also press at least a portion of the pipe 1012 against the insert member 1018. The insert member 1018 is hollow so that fluid flowing in the pipe 1012 can move through the insert member 1018, to the inlet 1029 of the spike 1028, and through the tap 1020 to the upper connector 1031 (in fluid communication). The upper connector 1031 may be connected, for example, to a pipe of an irrigation system for further transporting the fluid. In other exemplary embodiments, insert members may be solid, and engagement of retention members with external portions of pipes functions to compress the pipes against the insert members, deform the outer surfaces of the pipes, and/or penetrate the pipes without creating fluid connections with the pipes. Here, the insert members may include fixtures, structures, etc. configured (e.g., sized, shaped, constructed, etc.) to receive at least part of the pipes compressed by the retention members. In still other exemplary embodiments, fittings may include insert members and/or taps that can be solid structures such that connection of the fittings to pipes may terminate the pipes.

The tap 1020 also includes wing extensions 1035 that can function as finger grips for use by a user in rotationally advancing the tap 1020 into the housing 1016 when installing/connecting the fitting 1010 to the end portion of the pipe 1012. This, in turn, may allow for elimination of the need for additional tools to install the fitting 1010 to the end portion of the pipe 1012. The fitting 1010 may advantageously provide a tool-less grip, for example, when dry, when wet, etc.

The tap 1020 may further include structures and geometries different from those described and illustrated herein. For example, the tap 1020 may include structures and geometries that can provide added surface contact area with the pipe 1012 when engaged with the pipe 1012 for help in retaining the fitting 1010 on the pipe 1012. The spike 1028 may be configured as a cylinder having an interfacing end surface that includes a convex semi-spherical surface that provides more surface contact, hence more friction-based stability with the pipe 1012 when engaged with the pipe 1012. In other exemplary embodiments, spikes may provide an inwardly radial compressive force to pipes when engaged with the pipes.

An exemplary process for connecting the fitting 1010 to the end portion of the pipe 1012 will now be described. The tap 1020 may be initially removed from the housing 1016, or initially moved away from the insert member 1018 to provide room for the end portion of the pipe 1012 to be received in the housing 1016 (e.g., the tap 1020 may be moved to a first position, disengaged from the pipe 1012). An open end of the end portion of the pipe 1012 may be aligned with the insert member 1018, and the insert member 1018 may be inserted into the pipe 1012. The O-ring 1048 may be compressively engaged with an inner surface of the pipe 1012. The pipe 1012 may be moved (e.g., slid, etc.) into the housing 1016 until at least part of the pipe 1012 is adjacent and/or contacts at least part of an end portion of the housing 1016. Openings 1036 may be provided in the housing 1016 to view proper insertion of the pipe 1012 into the housing 1016.

The tap 1020 may be moved (e.g., rotated, screwed, etc.) through the upper neck 1017 of the housing 1016 and into engagement (e.g., a second position, etc.) with the end portion of the pipe 1012, which is received in the housing 1016. For example, a user may grasp the wing extensions 1035 of the tap 1020 and rotate the tap 1020 relative to the housing 1016. The threaded connection between the tap 1020 and the upper neck 1017 of the housing 1016 moves the tap 1020 generally downward. The spike 1028 of the tap 1020 can engage and penetrate the pipe 1012 and establish fluid communication between the pipe 1012 (e.g., via the hollow insert member 1018, etc.) and the tap 1020. In this embodiment, the tap 1020 may help secure the insert member 1018 within the pipe 1012 and may help hold the fitting 1010 on the end portion of the pipe 1012. A second fitting (e.g., 1010, etc.) may be installed to another end portion of the pipe 1012 within the scope of the present disclosure such that fittings are installed to both end portions of the pipe 1012.

In the illustrated embodiment, the tap 1020 penetrates the end portion of the pipe 1012 (through opening 1033 in the insert member 1018 (FIG. 38)) to help secure, hold, etc. the fitting 1010 to/on the end portion of the pipe 1012. This can establish fluid communication between the pipe 1012, the insert member 1018, and the tap 1020. When penetrating the pipe 1012, the tap 1020 moves part of the pipe wall 1024 into the opening 1033 in the insert member 1018. This helps fluidly seal the fitting at the opening 1033. The tap 1020 may include additional structure adjacent the spike 1028 to help further fluidly seal the tap against the pipe. For example, the tap 1020 may include a sealing member extending generally around the spike 1020 configured to engage and fluidly seal the wall 1024 of the pipe 1012 when the tap is inserted into the housing 1016.

Figure 44:
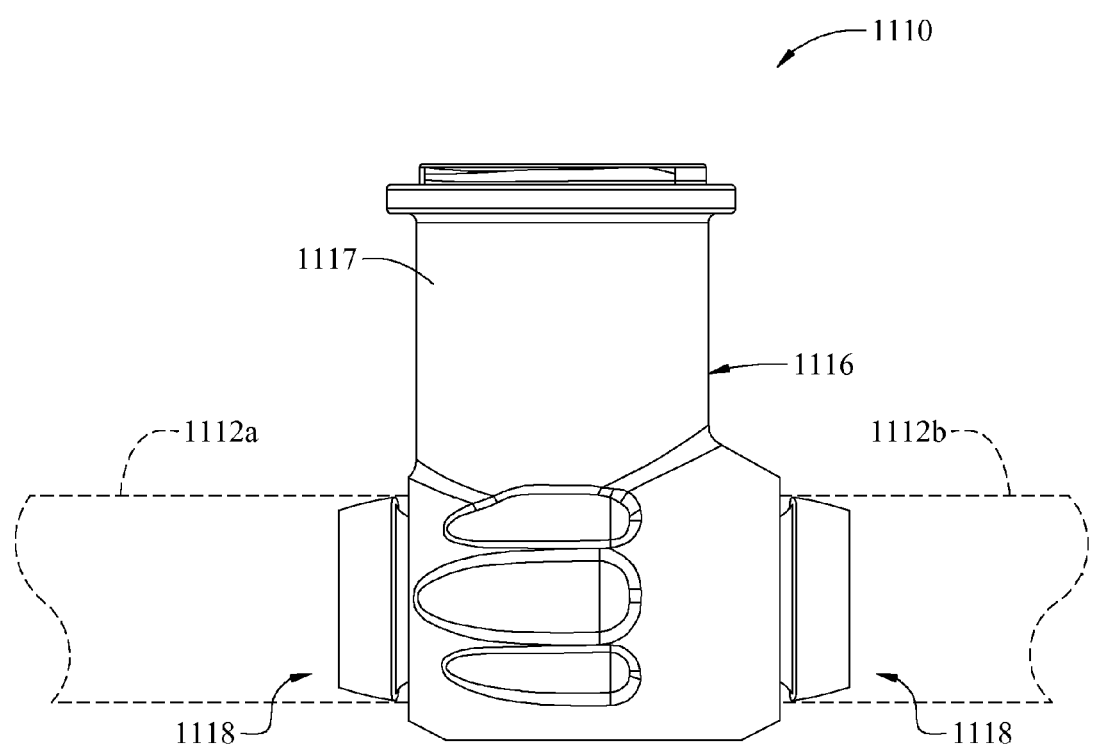
FIG. 44 is a side elevation view of another exemplary embodiment of a fitting.

FIG. 44 illustrates another exemplary embodiment of a fitting 1110 connectable to end portions of pipes 1112a, 1112b, for example, for interconnecting the pipes 1112a, 1112b. In this embodiment, the fitting 1110 allows fluid to flow through the fitting 1110 from a first pipe 1112a to at least a second pipe 1112b. A housing 1116 of the fitting 1110 is shown connected to end portions of the two pipes 1112a, 1112b. A tap (not shown) may, for example, thread through an upper neck 1117 of the housing 1116 to connect the fitting 1110 to the first pipe 1112a (e.g., by engaging the pipe 1112a, penetrating the pipe 1112a, combinations thereof, etc.). The second pipe 1112b may connect to the fitting 1110 at a generally opposite end of the housing 1116 from the first pipe 1112a by any acceptable or suitable connection, including, for example, a frictional connection between the pipe 1112b and the housing 1116 and/or between the pipe 1112b and an insert member 1118 associated with the housing 1116. The tap may be hollow to allow fluid to flow from at least one of the pipes 1112a, 1112b, to the housing 1116, and through the tap. For example, fluid may flow to the housing 1116 through the first pipe 1112a. Some fluid may flow from the housing 1116 through the tap, and/or some fluid may flow from the housing 1116 through the second pipe 1112b. The tap may carry fluid from the first pipe 1112a to, for example, an irrigation sprinkler. The second pipe 1112b may carry fluid from the first pipe 1112a to, for example, other irrigation components, fittings, etc. In this embodiment, the housing 1116 is generally T-shaped. In other exemplary embodiments, housings may be other than T-shaped (e.g., Y-shaped, etc.). In still other exemplary embodiments, the tap may have a solid construction.

Figure 45:
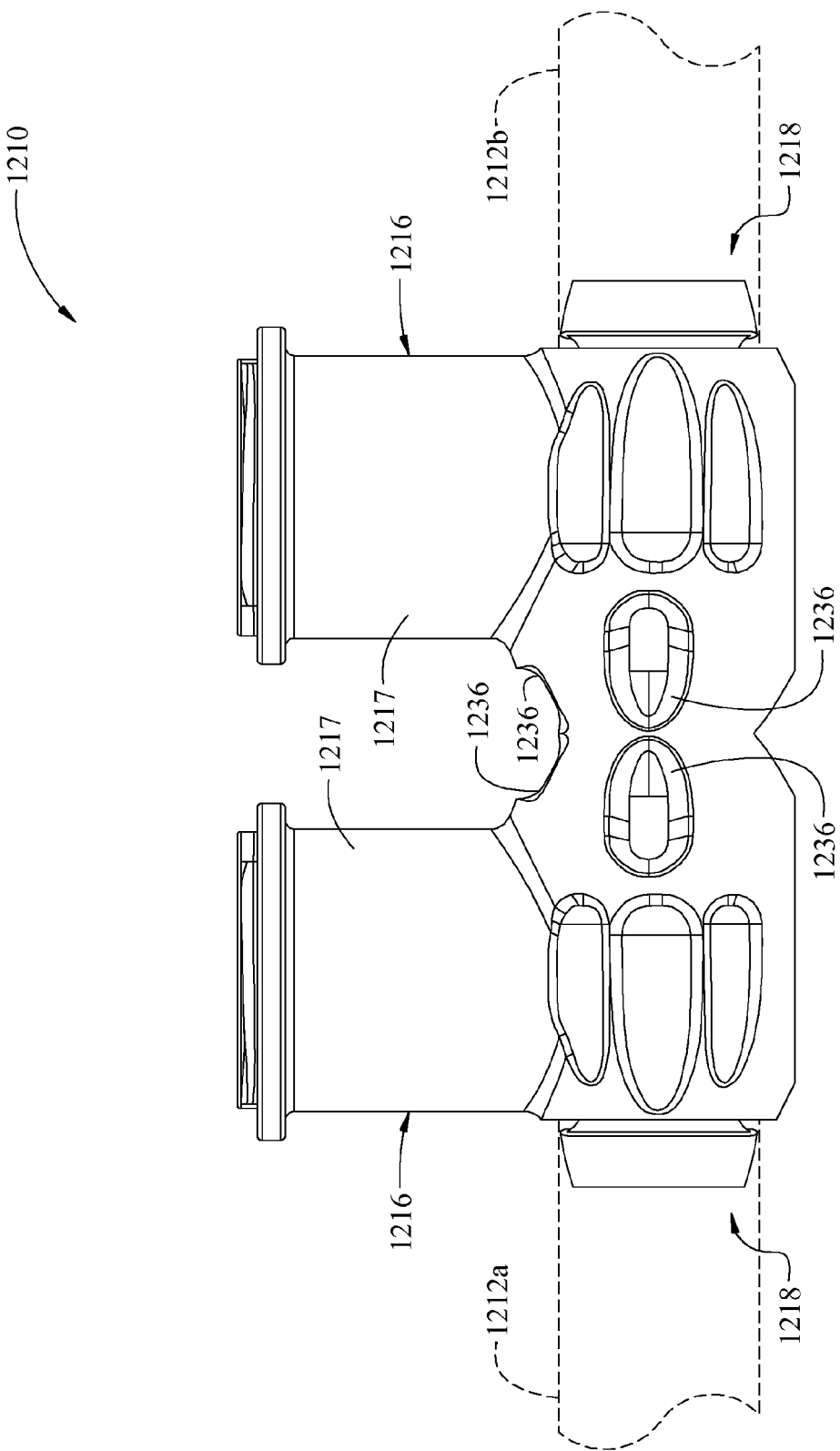
FIG. 45 is a side elevation view of still another exemplary embodiment of a fitting.

FIG. 45 illustrates a further exemplary embodiment of a fitting 1210 connectable to end portions of pipes 1212a, 1212b, for example, for interconnecting the pipes 1212a, 1212b. In this embodiment, the fitting 1210 allows fluid to flow through the fitting 1210 from a first pipe 1212a to at least a second pipe 1212*b*. The fitting 1210 includes first and second monolithically formed housings 1216*a*, 1216*b*. Each of the housings 1216*a*, 1216*b* includes an insert member 1218 disposed within the housing 1216*a*, 1216*b*. The first housing 1216*a* is configured to connect to the first pipe 1212*a*, and the second housing 1216*b* is configured to connect to the second pipe 1212*b*. Openings 1236 may be provided in the housings 1216*a*, 1216*b* to view proper insertion of the pipes 1212*a*, 1212*b* into the housings 1216*a*, 1216*b*. Each of the housings 1216*a*, 1216*b* also includes an upper neck 1217 configured to receive taps (not shown) into the respective housing 1216*a*, 1216*b* to connect the fitting 1210 to the first and second pipes 1212*a*, 1212*b* (e.g., by engaging the pipes 1212*a*, 1212*b*, penetrating the pipes 1212*a*, 1212*b*, combinations thereof, etc.). The taps and upper necks 1217 may include mating threads to allow the taps to be threadingly received into the housings 1216*a*, 1216*b*. The taps may be hollow so that fluid may flow from at least one of the pipes 1212*a*, 1212*b*, to at least one of the housings 1216*a*, 1216*b*, and through at least one of the taps and/or through at least one of the pipes 1212*a*, 1212*b*. For example, the one or more of the taps may carry fluid from the first pipe 1212*a* to, for example, irrigation sprinklers. And the second pipe 1212*b* may carry fluid from the first pipe 1212*a* to, for example, other irrigation components.

Figure 46:
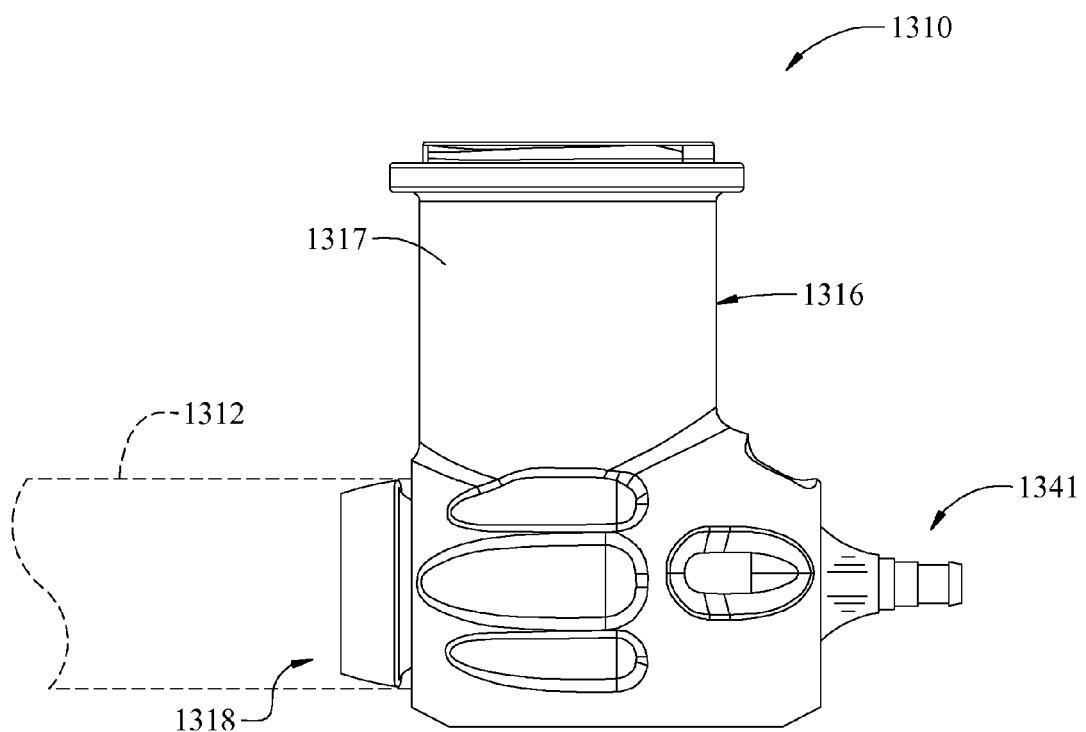
FIG. 46 is a side elevation view of a further exemplary embodiment of a fitting.

FIG. 46 illustrates another exemplary embodiment of a fitting 1310 connectable to an end portion of a pipe 1312. In this embodiment, the fitting 1310 allows fluid to flow through the fitting 1310. A tap (not shown) may thread through an upper neck 1317 of a housing 1316 to connect the housing 1316 to the pipe 1312 (e.g., by engaging the pipe 1312, penetrating the pipe 1312, combinations thereof, etc.). Also in this embodiment, the housing 1316 includes a connector 1341 (or coupler) at one end of the housing 1316. The connector is shown at the end of the housing 1316 generally opposite an insert member 1318. And the connector 1341 is shown as a barbed-style connector. In other exemplary embodiments, the connector 1341 may be differently located on the housing 1316, the connector 1341 may be free of barbs, the connector 1341 may have other configurations than that shown, etc. The connector 1341 may be used, for example, for connecting the housing 1316 to an irrigation line or pipe (not shown). The irrigation line may be flexible (e.g., poly-pipe, etc.) and may be slid over the connector 1341 for fluidly linking (or connecting) the irrigation line to the pipe 1312 through the fitting housing 1316. A clamp may be used to secure the irrigation line on the connector 1341. The irrigation line may carry fluid from the pipe 1312 to, for example, an irrigation sprinkler. Other embodiments may include housings with other suitable connectors or couplers and are within the scope of the disclosure. For example, a housing may include an elbow connector, a generally L-shaped connector, etc.

Various retention members (e.g., 20, 120, 220, 320, 420, 620, 720, 820, 920, 1020, etc.) have been described and illustrated herein. These retention members are provided for exemplary purposes and are not intended to limit the present disclosure. Retention members having other shapes, configurations, etc. suitable for use in connecting a fitting to an end portion of a pipe are within the scope of the present disclosure.

In another exemplary embodiment, a fitting connectable to an end portion of a pipe may include a housing and a retention member for use in connecting the fitting to the pipe. The housing is configured (e.g., sized, shaped, constructed, etc.) to receive an end portion of the pipe. The housing includes a longitudinal slot extending at least partly along a longitudinal length of the housing that allows the housing to expand radially to accommodate and receive the end portion of the pipe into the housing. The retention member may include, for example, a strap, a clamp, etc. positioned, for example, at least partly around an exterior portion of the housing. When the pipe is received in the housing, the retention member may be adjusted (e.g., moved, clamped, etc.) from an open position to a clamping position to radially squeeze, compress, etc. the housing against the pipe. In this embodiment, an insert member may not be included. However, it is understood that an insert member may be included without departing from the scope of the present disclosure.

Fittings (e.g., 10, 110, 210, 310, 410, 510, 610, 710, 810, 910, 1010, 1110, 1210, 1310, etc.) may be constructed, formed, manufactured, etc. from materials including, for example, flexible materials, rigid materials, rubber materials, plastic materials, metal materials (e.g., copper, etc.), combinations thereof, etc. within the scope of the present disclosure. In addition, fittings (e.g., 10, 110, 210, 310, 410, 510, 610, 710, 810, 910, 1010, 1110, 1210, 1310, etc.) may be able to handle fluid pressures, for example, greater than seventy pounds per square inch and/or less than seventy pounds per square inch within the scope of the present disclosure.

Certain terminology is used herein for purposes of reference only, and thus is not intended to be limiting. For example, terms such as "upper", "lower", "above", "below", "top", "bottom", "upward", "downward", "rearward", and "forward" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A fitting connectable to an end portion of a pipe, the fitting comprising:
   a housing formed of a rigid plastic material and configured for receiving at least part of the end portion of the pipe into the housing;
   an insert member formed of a rigid plastic material and being fixedly secured to and disposed at least partly within the housing, the insert member being configured to be received at least partly within the end portion of the pipe when at least part of the end portion of the pipe is received into the housing;

the housing and insert member cooperatively defining a passageway therebetween for receiving at least part of the end portion of the pipe between the insert member and the housing when at least part of the end portion of the pipe is received into the housing;

a retention member formed of a rigid plastic material and movable relative to the housing for connecting the fitting to the end portion of the pipe, the retention member being selectively moved into the passageway between the housing and the insert member to engage at least part of the end portion of the pipe when the end portion of the pipe is received into the housing; and the insert member and the retention member having sufficient rigidity to retain the pipe within the housing by compressing a wall of the pipe radially therebetween.

2. The fitting set forth in claim 1, wherein the retention member includes a lever coupled to the housing for pivotal movement relative to the housing.

3. The fitting set forth in claim 1, wherein the retention member includes a threaded tap, the housing including a correspondingly threaded portion configured to receive the threaded tap into connection with the housing to help secure the fitting to the end portion of the pipe.

4. The fitting set forth in claim 3, wherein the tap penetrates the at least part of the end portion of the pipe to help secure the fitting to the end portion of the pipe.

5. The fitting set forth in claim 1, wherein the retention member includes a sleeve disposed for sliding movement at least partly within the housing.

6. The fitting set forth in claim 5, wherein the sleeve is disposed for sliding movement within the passageway between the housing and the insert member, longitudinally relative to the insert member.

7. The fitting set forth in claim 1, further comprising one more housing and one more retention member for interconnecting end portions of at least two distinct pipes to fluidly connect the at least two pipes.

8. The fitting set forth in claim 7, wherein the fitting is generally T-shaped and comprises three housings and three retention members for fluidly interconnecting end portions of the at least two distinct pipes to each other.

9. The fitting set forth in claim 1, wherein the housing receives the end portion of the pipe and caps the end portion of the pipe against fluid-flow therethrough.

10. The fitting set forth in claim 1, wherein the retention member includes a clamp positioned at least partly around an exterior portion of the housing.

11. The fitting set forth in claim 10, wherein the clamp is movable to compress at least part of the housing against at least part of the end portion of the pipe, the housing pressing at least part of the end portion of the pipe against at least part of the insert member to help secure the fitting to the end portion of the pipe.

12. The fitting set forth in claim 1, further comprising at least one sealing member disposed between the insert member and at least part of the end portion of the pipe for generally fluidly sealingly engaging the end portion of the pipe when at least part of the end portion of the pipe is received into the housing.

13. The fitting set forth in claim 1, further comprising at least one sealing member disposed between the housing and the at least part of the end portion of the pipe for generally fluidly sealingly engaging an outer surface of the end portion of the pipe when at least part of the end portion of the pipe is received into the housing.

14. The fitting set forth in claim 1, in combination with the pipe, wherein the pipe is formed of a flexible plastic material, and the insert member and the retention member deform the wall of the pipe radially against the insert member when pivoting the retention member into engagement with the pipe.

15. A fitting connectable to an end portion of a pipe, the fitting comprising:

a housing configured for receiving at least part of the end portion of the pipe into the housing;

an insert member fixedly secured to and disposed at least partly within the housing, the insert member being configured to be received at least partly within the end portion of the pipe when at least part of the end portion of the pipe is received into the housing; and a retention member pivotally coupled to the housing for pivotal movement relative to the housing to selectively connect the fitting to the end portion of the pipe, the retention member being pivoted to engage and radially compress at least part of the end portion of the pipe against the insert member to help frictionally secure the end portion of the pipe in the housing when at least part of the end portion of the pipe is received into the housing.

16. The fitting set forth in claim 15, wherein the retention member includes a lever having a clamp and an arm, the arm pivotally moving the clamp to engage the end portion of the pipe and apply pressure against at least part of the end portion of the pipe when at least part of the end portion of the pipe is received into the housing.

17. The fitting set forth in claim 16, wherein the housing includes an opening through which at least part of the clamp of the retention member extends to engage the end portion of the pipe when at least part of the end portion of the pipe is received into the housing.

18. The fitting set forth in claim 15, wherein the insert member and retention member are formed of a material having sufficient rigidity to deform the pipe radially against the insert member when pivoting the retention member into engagement with the pipe.

19. The fitting set forth in claim 15, wherein the retention member does not extend through the end portion of the pipe when engaging the end portion of the pipe.

20. The fitting set forth in claim 15, in combination with the pipe, wherein the pipe is formed of a flexible plastic material, and the insert member and the retention member are formed of a relatively rigid plastic material which compresses and deforms a wall of the pipe upon pivoting the retention member into engagement with the pipe.

21. The fitting set forth in claim 20, wherein the pipe has a smooth cylindrical exterior surface extending throughout the end portion of the pipe being received within the housing.

22. The fitting set forth in claim 20, wherein the pipe has a central longitudinal axis extending therethrough and the retention member is constructed to pivot about an axis parallel with the central axis of the pipe.

23. The fitting set forth in claim 15, wherein the retention member is constructed to pivot between a first position in which the fitting is disconnected from the end portion of the pipe and a second position in which the fitting is connected to the end portion of the pipe, the retention member pivoting from the first position to the second position to engage the end portion of the pipe and apply radial pressure against at least part of the end portion of the pipe to help frictionally secure the fitting to the end portion of the pipe.

24. A fitting in combination with a pipe, the combination comprising:

a generally flexible pipe having a tubular end portion with a central axis extending therethrough;

a housing configured with an open space for receiving at least part of the end portion of the pipe into the housing;

an insert member fixedly secured to and disposed at least partly within the housing, the insert member being configured to be received at least partly within the end portion of the pipe when at least part of the end portion of the pipe is received into the housing;

a retention member which selectively moves relative to the housing to constrict the size of the open space within the housing and engage at least part of the end portion of the pipe when the end portion of the pipe is received into the housing, the retention member and insert member being formed of a material having greater rigidity than the pipe so as to radially compress at least part of the end portion of the pipe against the insert member when the retention member is moved into engaging relation with the end portion of the pipe; and at least one sealing member positioned about a surface of the insert member and configured for engaging a surface of the end portion of the pipe in sealing relation upon insertion of the insert member into the end portion of the pipe.

25. The fitting set forth in claim 24, wherein the retention member includes a lever coupled to the housing for pivotal movement relative to the housing about an axis extending parallel with the central axis of the pipe.

26. The fitting set forth in claim 24, wherein the retention member includes a sleeve disposed for sliding movement at least partly within the housing.

27. The fitting set forth in claim 24, wherein the retention member includes a threaded tap, and wherein the housing includes a correspondingly threaded portion configured to receive the threaded tap into the housing to help secure the fitting to the end portion of the pipe.

28. The fitting set forth in claim 27, wherein the housing includes internal threads and the retention member includes external threads configured to mate with the internal threads of the housing.

29. The fitting set forth in claim 27, wherein the housing includes external threads and the retention member includes internal threads configured to mate with the external threads of the housing.

30. The fitting set forth in claim 27, wherein the insert member includes an opening for receiving at least part of the tap into the opening when the tap is received into the housing.

31. The fitting set forth in claim 27, wherein the tap includes a hollow portion and an inlet for receiving a fluid into the hollow portion.

32. The fitting set forth in claim 31, wherein the insert member has a fluid passageway extending therethrough and the tap is configured to penetrate a wall of the end portion of the pipe and extend into the passageway of the insert member, thereby establishing fluid communication between the end portion of the pipe and the hollow portion of the tap.

33. The fitting set forth in claim 32, wherein the tap engages an outer surface of the end portion of the pipe after penetrating the wall of the end portion of the pipe to, at least partially, fluidly seal a point of coupling of the tap with the end portion of the pipe.

34. The fitting set forth in claim 31, wherein the tap includes a connector fluidly connected to the hollow portion of the tap.

35. The fitting set forth in claim 24, wherein the at least one sealing member includes an elastomeric O-ring.

36. The fitting set forth in claim 24, wherein at least one sealing member is disposed between the housing and the end portion of the pipe for generally fluidly sealingly engaging an outer surface of the end portion of the pipe when at least part of the end portion of the pipe is received into the housing.

* * * * *